(12) United States Patent
Hyodo

(10) Patent No.: US 8,406,614 B2
(45) Date of Patent: Mar. 26, 2013

(54) RECORDING DEVICE AND METHOD

(75) Inventor: Kenji Hyodo, Kanagawa (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 10/517,862

(22) PCT Filed: Apr. 9, 2004

(86) PCT No.: PCT/JP2004/005105
§ 371 (c)(1),
(2), (4) Date: Dec. 14, 2004

(87) PCT Pub. No.: WO2004/093074
PCT Pub. Date: Oct. 28, 2004

(65) Prior Publication Data
US 2005/0238329 A1 Oct. 27, 2005

(30) Foreign Application Priority Data
Apr. 16, 2003 (JP) ................... 2003-111631

(51) Int. Cl.
*H04N 5/92* (2006.01)

(52) U.S. Cl. ..................................... 386/337

(58) Field of Classification Search .......... 386/90, 386/111, 108, 35, 124–125, 96, 95, 232, 386/239, 241, 248, 326, 337, 338, 339, 340
See application file for complete search history.

(56) References Cited

U.S. PATENT DOCUMENTS

| | | | | |
|---|---|---|---|---|
| 5,541,739 A | * | 7/1996 | Tanaka | 386/39 |
| 5,589,993 A | * | 12/1996 | Naimpally | 386/81 |
| 6,075,920 A | * | 6/2000 | Kawamura et al. | 386/95 |

(Continued)

FOREIGN PATENT DOCUMENTS

| | | |
|---|---|---|
| EP | 1 187 475 | 3/2002 |
| JP | 7-327202 | 12/1995 |

(Continued)

OTHER PUBLICATIONS

Content Based Description of Audio in the Context of AXMEDIS by Nicolas Scaringella, Martin Schmucker, and Michael Arnold (Proceedings of the Second International Conference on Automated Production of Cross Media Content for Multi-Channel Distribution (AXMEDIS '06) p. 19-26).*

*Primary Examiner* — Tat Chio
(74) *Attorney, Agent, or Firm* — Frommer Lawrence & Haug LLP; William S. Frommer

(57) ABSTRACT

Auxiliary AV data of a lower rate is formed in an auxiliary AV data converting unit on the basis of video and audio data of a main line system. The audio data of the main line system in which the number of channels is equal to 0 and 4 or 8 channels can exist mixedly. In the auxiliary AV data, the number of channels of the audio data is fixed to 8 channels. Audio data showing silence is outputted to the channels which do not correspond to the channels of the audio data of the main line system of the auxiliary AV data. Since the number of channels of the audio data of the auxiliary AV data is fixed irrespective of the number of channels of the audio data of the main line system, the editing or searching operation using the auxiliary AV data can be executed without paying attention to a change in the number of channels of the audio data of the main line system, or the like.

2 Claims, 19 Drawing Sheets

U.S. PATENT DOCUMENTS

| | | | |
|---|---|---|---|
| 6,339,676 B1 * | 1/2002 | Amada et al. | 386/108 |
| 6,567,371 B1 * | 5/2003 | Otomo et al. | 369/275.3 |
| 6,788,881 B1 * | 9/2004 | Kuroiwa et al. | 386/96 |
| 2003/0215212 A1 * | 11/2003 | Furukawa et al. | 386/46 |

FOREIGN PATENT DOCUMENTS

| | | |
|---|---|---|
| JP | 11 136631 | 5/1999 |
| JP | 2000-149454 | 5/2000 |

\* cited by examiner

Fig. 2

| _RecStart | RECORDING START POSITION |
|---|---|
| _RecEnd | RECORDING END POSITION |
| _ShotMark1 | ARBITRARY POSITION 1 |
| _ShotMark2 | ARBITRARY POSITION 2 |
| _Cut | CUTTING POSITION |
| _Flash | FLASH DETECTING POSITION |
| _FilterChange | LENS FILTER CHANGE POSITION |
| _ShutterSpeedChange | SHUTTER SPEED CHANGE POSITION |
| _GainChange | GAIN CHANGE POSITION |
| _WhiteBalanceChange | WHITE BALANCE CHANGE POSITION |
| _OverBrightness | POSITION WHERE VIDEO OUTPUT LEVEL EXCEEDS 100% |
| _OverAudioLimiter | POSITION WHERE AUDIO OUTPUT LEVEL EXCEEDS LIMIT VALUE |
| _In-XXX | CUTTING START POSITION OF MATERIAL |
| _Out-XXX | CUTTING END POSITION OF MATERIAL |

*Fig. 3*

| Key (16 BYTES) | L (1 BYTE) | Value (MAX. 32 BYTES) |

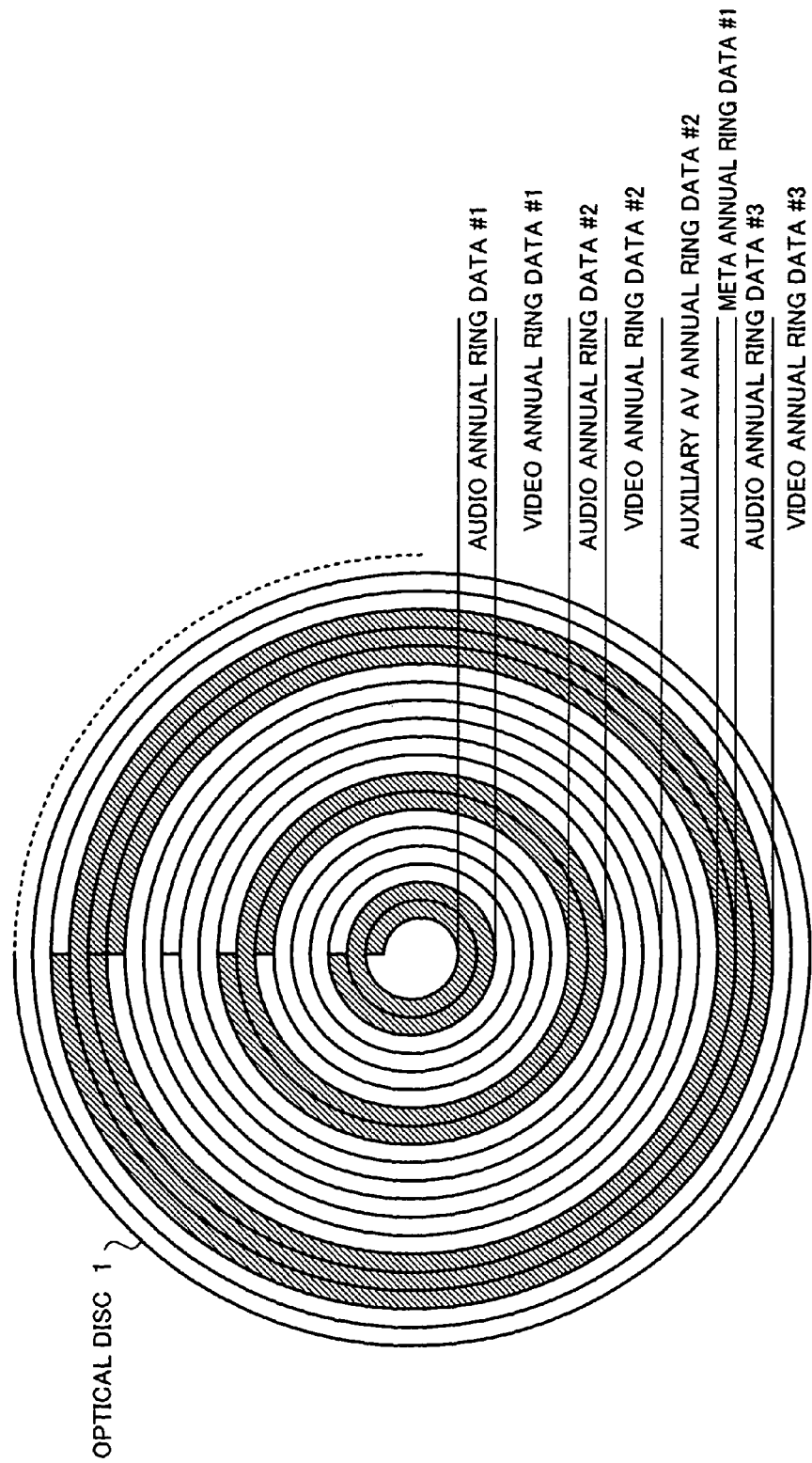

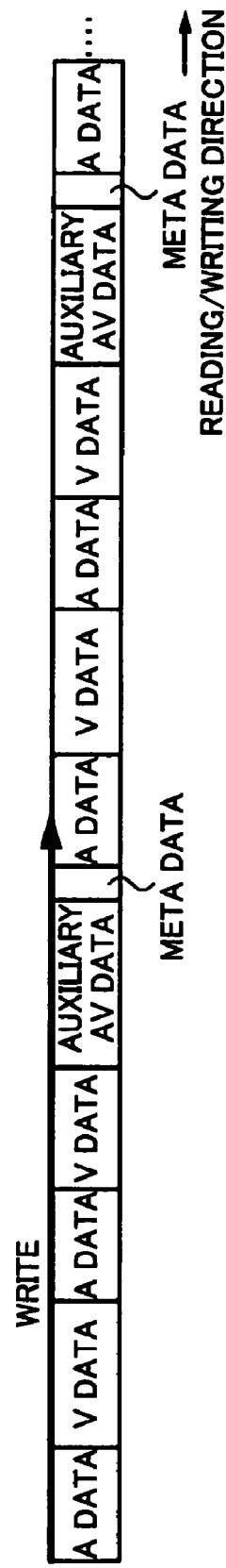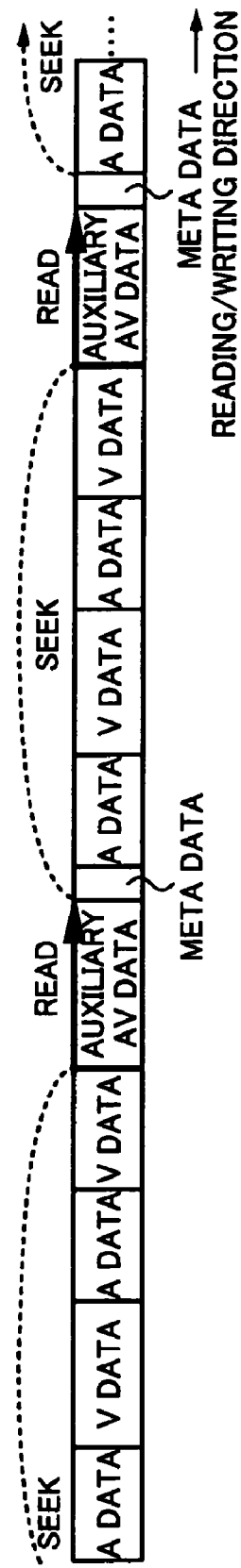

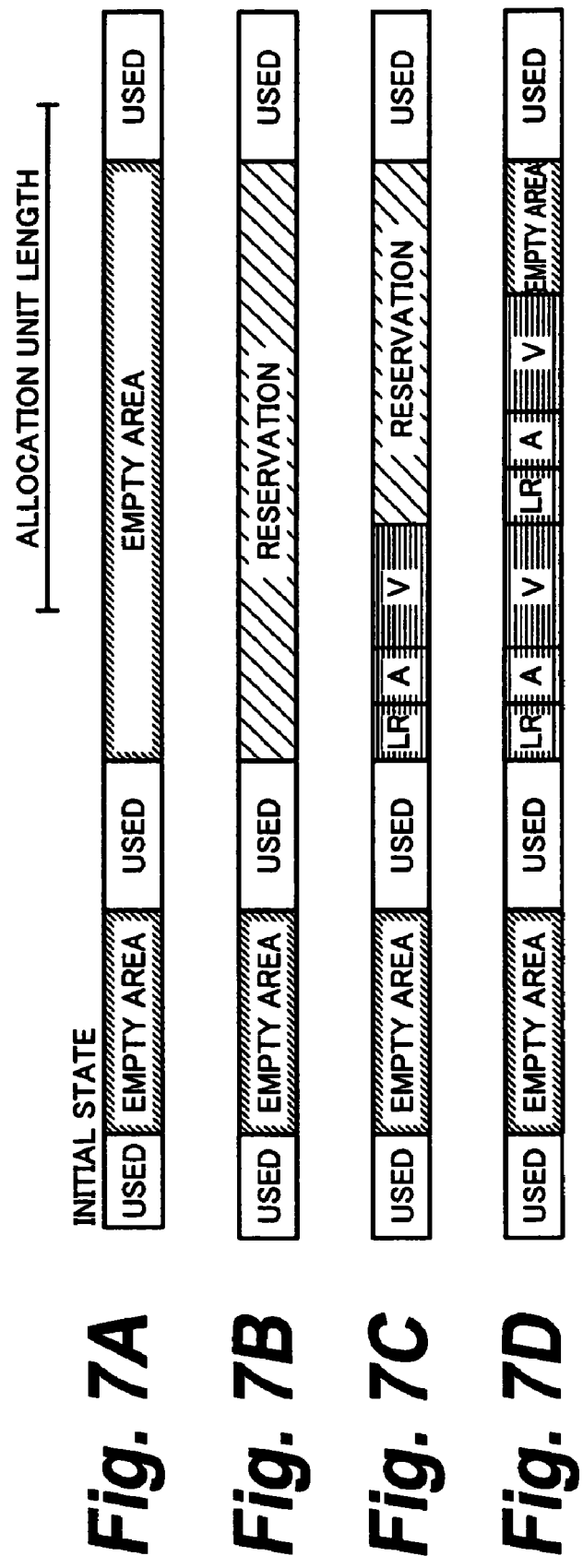

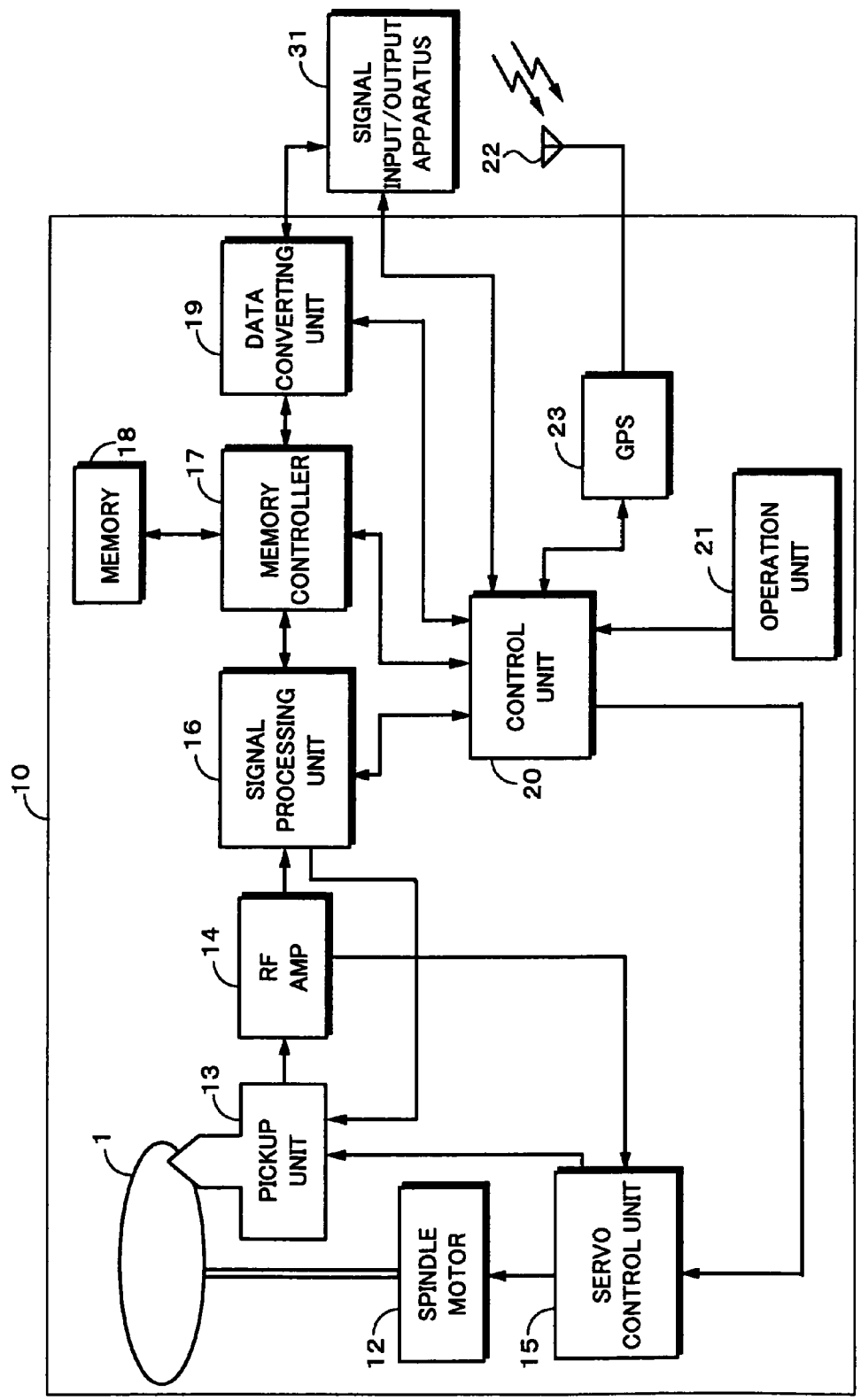

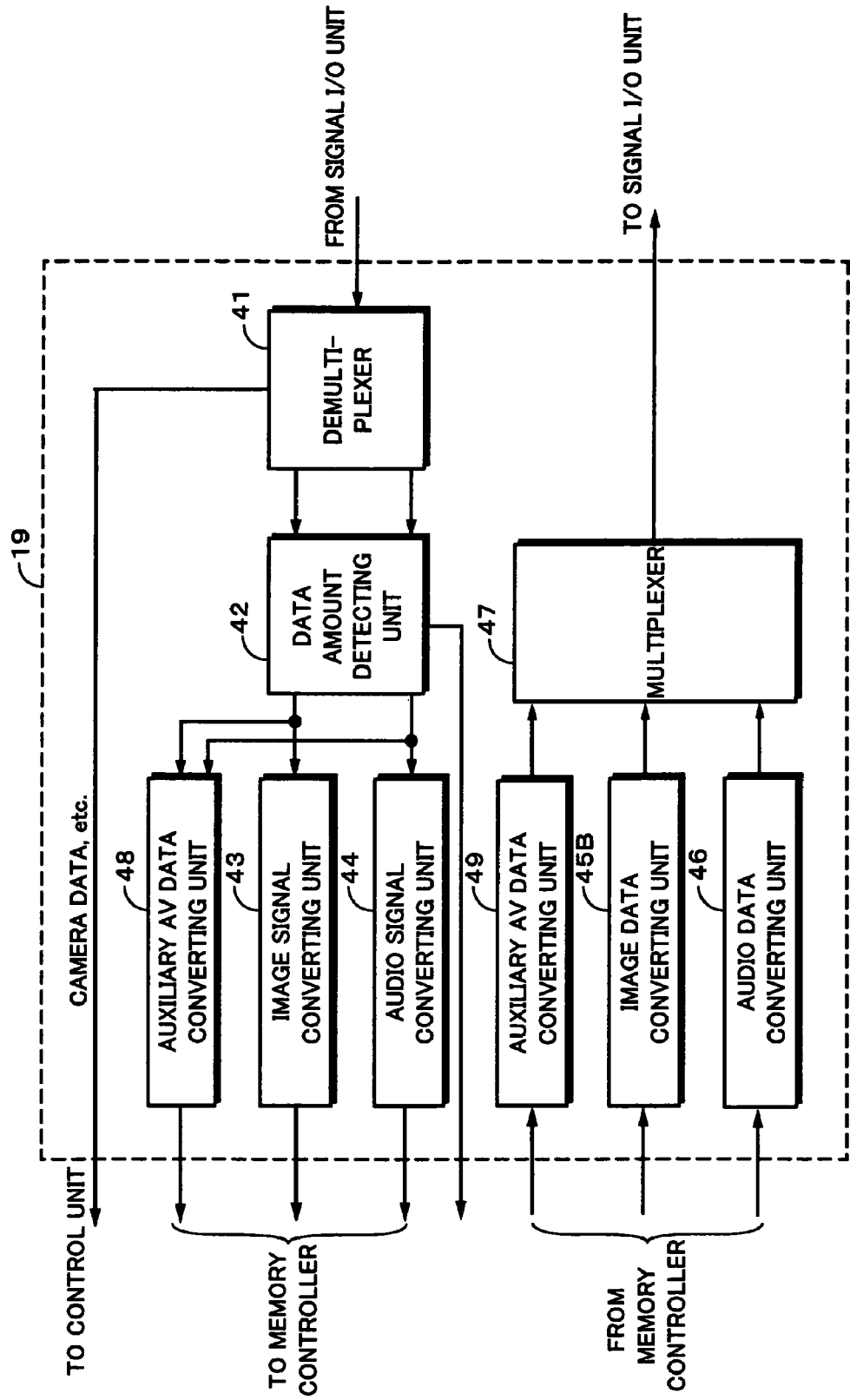

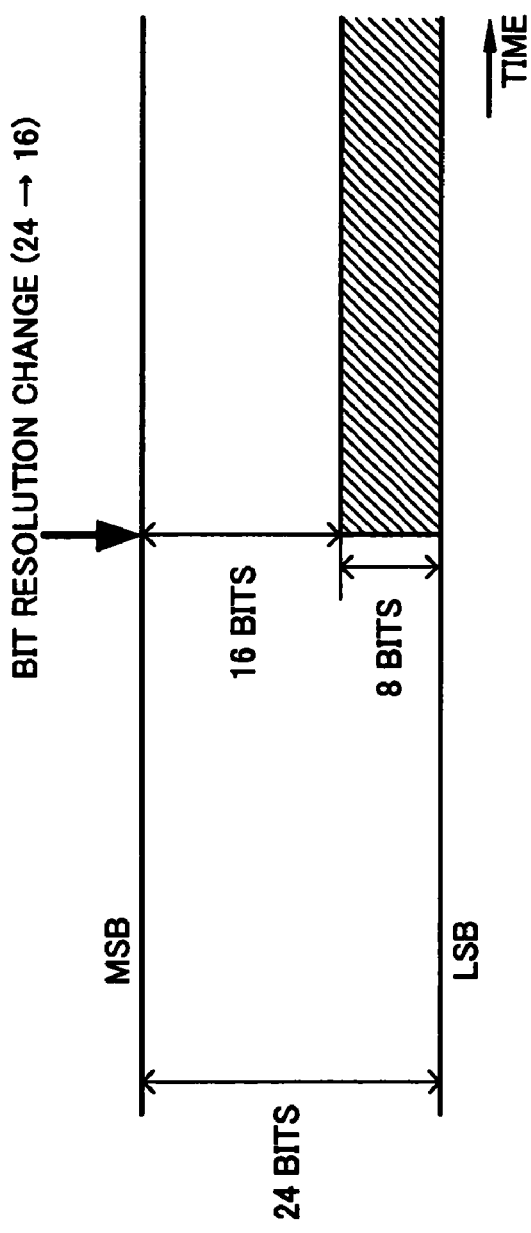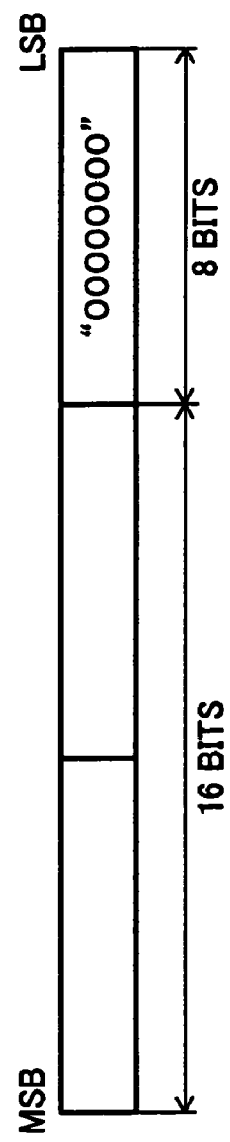
Fig. 18A
Fig. 18B

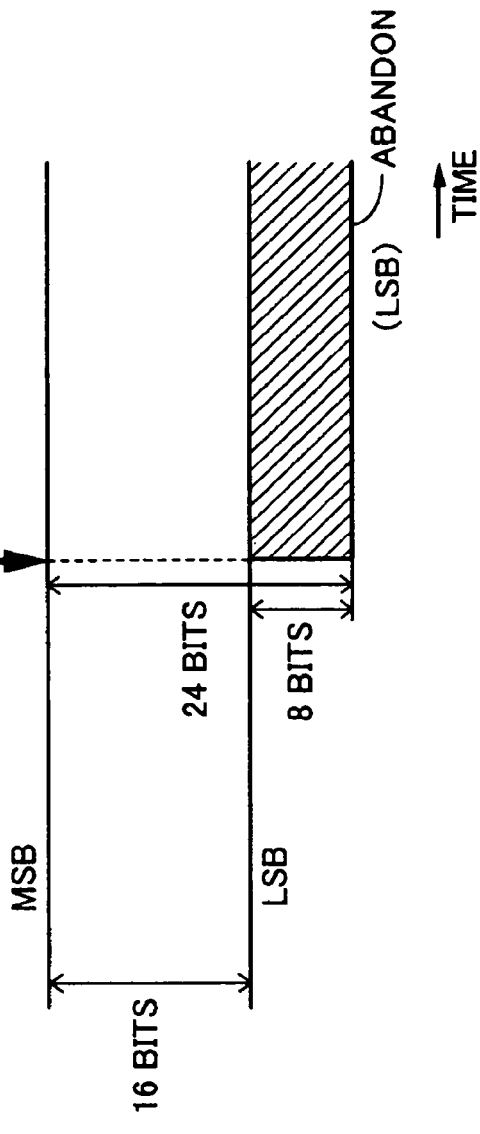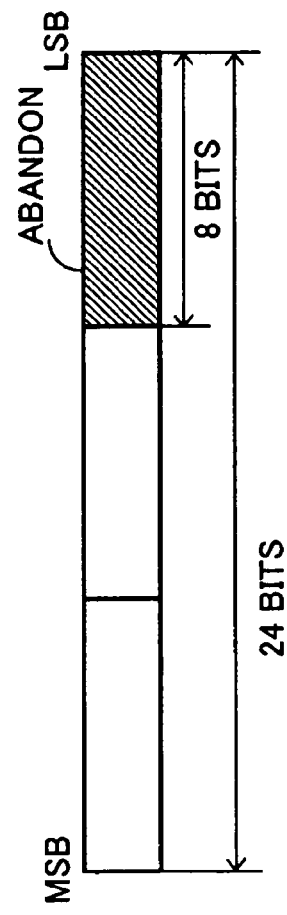
Fig. 19A
Fig. 19B

RECORDING DEVICE AND METHOD

TECHNICAL FIELD

The invention relates to recording apparatus and method in which audio and video data in a plurality of different formats can be mixedly recorded onto one disc-shaped recording medium so that they can be continuously reproduced.

BACKGROUND ART

In recent years, a disc-shaped recording medium which enables the recording and reproduction of a larger capacity by using a laser beam of a shorter wavelength as a light source has appeared. For example, by using a blue-violet laser which emits a laser beam having a wavelength of 405 nm as a light source and an optical disc of a one-side single-layer structure, a recording capacity of 23 GB (Gigabytes) has been realized.

Meanwhile, in recent years, there are also a variety of data formats of video data in association with the realization of high definition of an image in television broadcasting. A plurality of kinds are generally used with respect to each of an encoding/decoding system, a bit rate of data, a frames rate, the number of pixels, an aspect ratio of a display screen, and the like. Also with respect to audio data, a plurality of kinds are generally used with respect to each of bit resolution, an encoding/decoding system, and the like.

Further, in a video camera or the like, a method whereby a main video signal of high resolution is outputted and an auxiliary video signal of low resolution is formed on the basis of an image pickup signal has been proposed. The auxiliary video signal is suitable for use in the case where, for example, the user wants to transmit the video signal through a network as soon as possible or in the shuttle operation or the like at the time of searching for heads of video images by the fast forward operation or rewinding.

A video camera in which the disc-shaped recording medium of the large capacity as mentioned above is used, the main video signal of the high resolution is outputted, and the auxiliary video signal of the low resolution is formed has been disclosed in the Non-patent Document [AV Watch editorial department, "Sony, camcoder or the like using a blue-violet laser disc", "Sony, camcoder or the like using a blue-violet laser disc—exhibited at NAB 2003 held in April. Studio recorder and the like were also exhibited" [online], Mar. 5, 2003, Impress Corporation, AV Watch homepage (searched on Mar. 25, 2003, Internet <URL: http://www.watch.impress.co.jp/av/docs/20030305/sony.htm>)].

In such a situation, it is demanded that audio/video data (hereinafter, referred to as AV data) in a plurality of different data formats is allowed to exist mixedly on the disc-shaped recording medium of the large capacity mentioned above and can be continuously recorded and reproduced.

Hitherto, there is no such techniques that the AV data in a plurality of different data formats is allowed to exist mixedly and continuously recorded onto the recording medium, the AV data in a plurality of different data formats is continuously reproduced from the recording medium on which the AV data in a plurality of different data formats has been mixedly recorded, and the reproduced AV data is edited.

Particularly with respect to the audio data, it is general that the data of a plurality of channels is simultaneously handled and it is demanded that it is possible to flexibly cope also with a change in channel construction that is used.

DISCLOSURE OF INVENTION

It is, therefore, an object of the invention to provide recording apparatus and method in which audio and video data in a plurality of different formats can be mixedly recorded onto one disc-shaped recording medium so that they can be continuously reproduced.

Another object of the invention to provide recording apparatus and method which can also flexibly cope with a channel construction of audio data.

To solve the above problems, according to the invention, there is provided a recording apparatus for recording video data and audio data corresponding to the video data onto a disc-shaped recording medium, comprising: data forming means for forming second video data which is data based on first video data and whose transmission rate is lower than that of the first video data, forming second audio data having a plurality of channels which is data based on first audio data having zero, one, or a plurality of channels corresponding to the first video data and whose transmission rate is lower than that of the first audio data, and outputting data of a low rate in which the second video data and the second audio data have been multiplexed; and recording means for recording the first video data, the first audio data, and the low-rate data onto the disc-shaped recording medium, wherein the data forming means sets the number of channels of the second audio data to a fixed value irrespective of the number of channels of the first audio data.

According to the invention, there is provided a recording method of recording video data and audio data corresponding to the video data onto a disc-shaped recording medium, comprising: a data forming step of forming second video data which is data based on first video data and whose transmission rate is lower than that of the first video data, forming second audio data having a plurality of channels which is data based on first audio data having zero, one, or a plurality of channels corresponding to the first video data and whose transmission rate is lower than that of the first audio data, and outputting data of a low rate in which the second video data and the second audio data have been multiplexed; and a recording step of recording the first video data, the first audio data, and the low-rate data onto the disc-shaped recording medium, wherein in the data forming step, the number of channels of the second audio data is set to a fixed value irrespective of the number of channels of the first audio data.

As mentioned above, according to the invention, the low-rate data in which the second video data which is the data based on the first video data and whose transmission rate is lower than that of the first video data and the second audio data having a plurality of channels which is the data based on the first audio data having 0, 1, or a plurality of channels corresponding to the first video data and whose transmission rate is lower than that of the first audio data have been multiplexed is recorded onto the disc-shaped recording medium together with the first video data and the first audio data, and the number of channels of the second audio data is set to the fixed value irrespective of the number of channels of the first audio data. Therefore, even if there is a change in the number of channels of the first audio data, the editing and searching operations using the low-rate data can be executed by easy processes without paying attention to the change in the number of channels of the first audio data.

BRIEF DESCRIPTION OF DRAWINGS

FIG. 2 is a schematic diagram showing an example of reservation words which are used to define essence marks. FIG. 3 is a schematic diagram showing a data structure of an example of the essence marks. FIG. 4 is a schematic diagram showing a state of an example in which annual ring data has been formed on an optical disc. FIGS. 5A and 5B are schematic diagrams showing a state of an example in which data is written and read out onto/from the optical disc on which annual rings have been formed. FIGS. 7A-7D are diagrams for explaining allocation units. FIG. 14 is a block diagram showing a construction of an example of a disc recording and reproducing apparatus which can be applied to the embodiment of the invention. FIG. 15 is a block diagram showing a construction of an example of a data converting unit. FIGS. 18A and 18B are diagrams for explaining processes at the time when bit resolution of the audio data is changed. FIGS. 19A and 19B are diagrams for explaining processes at the time when the bit resolution of the audio data is changed.

BEST MODE FOR CARRYING OUT THE INVENTION

Figure 1:
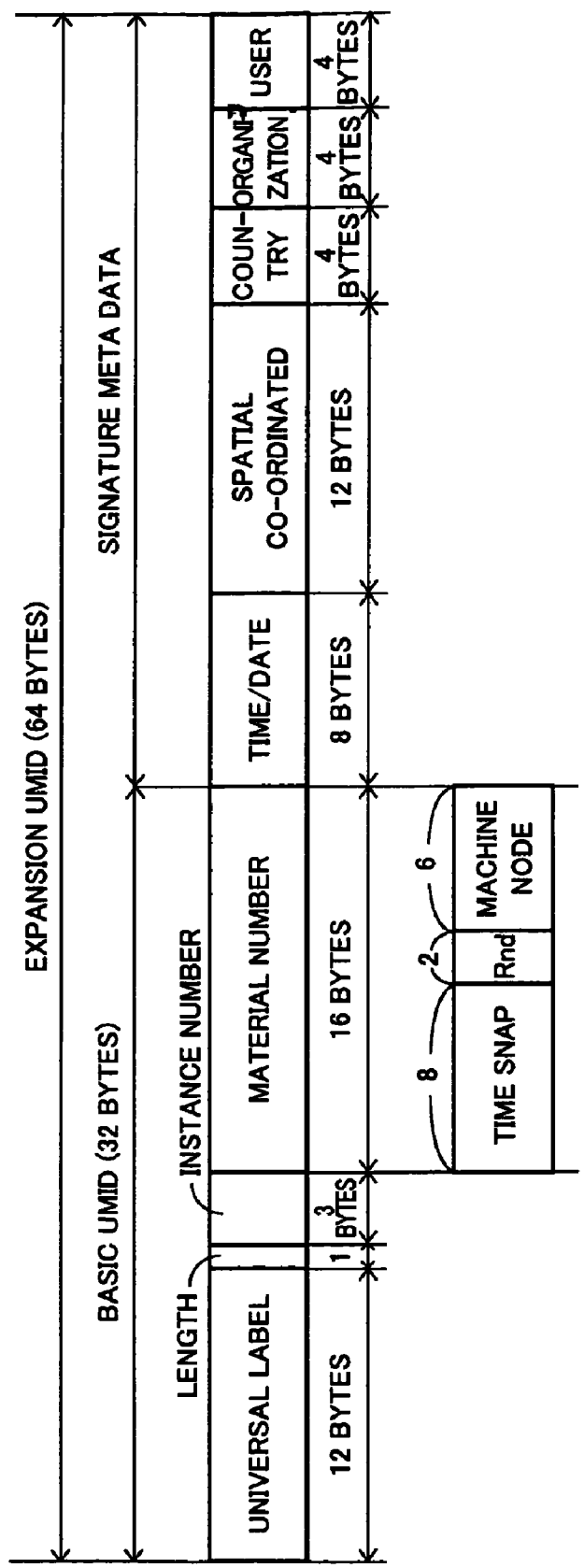
FIG. 1 is a schematic diagram showing a data structure of an UMID.

An embodiment of the invention will be described hereinbelow. In the invention, audio data and video data (hereinafter, properly abbreviated to "AV data") of a plurality of different signal kinds (formats) can be mixedly and continuously recorded on one disc-shaped recording medium (hereinafter, abbreviated to "disc") so that the AV data of a plurality of signal kinds can be continuously reproduced.

In the following description, the statement that "AV data of a plurality of signal kinds is mixedly and continuously recorded on one disc-shaped recording medium so that it can be continuously reproduced" is properly referred to as "can exist mixedly on one disc" or the like for the purpose of avoiding complexity.

First, an example of the signal kind (format) of data which can exist mixedly on one disc in the invention will be described.

As for encoding systems, for example, in an MPEG2 (Moving Pictures Experts Group 2) system, an encoding system for constructing the video data only by an I picture according to an intraframe encoding and an encoding system for constructing the video data by an I picture and a P picture and a B picture according to a predictive encoding can exist mixedly on one disc. Naturally, an encoding system other than the MPEG2 system can be also allowed to exist mixedly.

In the encoding system for constructing the video data only by the I picture as mentioned above, a GOP (Group Of Picture) as a unit of a random access is constructed by one I picture. Such a system is called a "single GOP system" hereinbelow for convenience of explanation. In the embodiment of the invention, a 4:2:2 profile of MPEG2 is applied to such a single GOP system. According to the encoding system for constructing the video data by using the I, P, and B pictures, the GOP starts with the I picture and includes one or a plurality of P and B pictures. Such a system in which the GOP is constructed by a plurality of frames is called a "long GOP system" hereinbelow for convenience of explanation.

With respect to the video data, for example, the video data of bit rate modes 30 Mbps (Mega bit per second), 40 Mbps, and 50 Mbps in the above single GOP system can exist mixedly on one disc and the video data of a bit rate mode 25 Mbps in the long GOP can further exist mixedly on one disc. Further, the video data of other bit rate modes is also enabled to exist mixedly in the single GOP and the long GOP.

The bit rate mode is a mode for compression encoding the video data so that the bit rate value shown by the bit rate mode is set to the maximum value. For example, in the video data of the bit rate mode 50 Mbps, actually, the data of the bit rate of 50 Mbps or less is included in the transmission data in accordance with complexity of the image. To the frame of a data amount smaller than the bit rate shown by the bit rate mode, a difference of the data amount from the bit rate shown by the bit rate mode is embedded by predetermined padding data, thereby enabling an apparent bit rate to be set to the bit rate shown by the bit rate mode.

With respect to the video data, the data of the interlace system and the progressive system as scanning systems can exist mixedly on one disc. In each of the systems, the data of a plurality of frame rates can exist mixedly on one disc. As for a screen size, the respective data of aspect ratios 4:3 and 16:9 can be recorded so as to exist mixedly on one disc. For example, when the aspect ratio is equal to 4:3, the data of 640 pixels×480 lines of the standard definition (SD) and the data of 1440 pixels×1088 lines of the high definition (HD) can exist mixedly on one disc. Also when the aspect ratio is equal to 16:9, the data of image sizes of a plurality of kinds can similarly exist mixedly on one disc.

Further, also as for a color profile, it is not limited to 4:2:2 mentioned above but data of another format such as 4:2:0 or the like can exist mixedly.

With respect to the audio data, the audio data encoded by linear PCM (Pulse Code Modulation) (hereinafter, abbreviated to linear PCM audio data) and the audio data encoded by an encoding system other than the linear PCM (for example, the audio data obtained by further compression encoding the linear PCM audio data) can exist mixedly on one disc. The audio data corresponds to a plurality of kinds of bit resolution of, for example, 16 bits and 24 bits and the data of a combination of a plurality of channels such as 4 channels, 8 channels, and the like can exist mixedly on one disc.

With respect to the audio data, the number of recording channels can be selected from 0 channel (there is no audio), 4 channels, and 8 channels. When the number of channels of the inputted audio data is less than the selected number of recording channels, the audio data showing silence is recorded to the residual channels, so that the number of recording channels is maintained. For example, when the number "8 channels" is selected as the number of recording channels, if the audio data of 2 channels is inputted, the audio data of silence is recorded to the residual 6 channels, so that the audio data of 8 channels is recorded as recording data.

The audio data in which a plurality of channels have been multiplexed and which has been inputted is recorded as individual audio data every channel. Upon reproduction, for example, the individual audio data is multiplexed by an original multiplexing system and outputted.

In the embodiment of the invention, besides the AV data of the above main line system, that is, the AV data as a target of the actual broadcasting and editing, further, auxiliary AV data and meta data corresponding to the AV data of the main line system are recorded on the same disc.

The auxiliary AV data is audio/video data whose bit rate is lower than that based on the AV data of the main line system. The auxiliary AV data is formed by compression encoding the AV data of the main line system so that its bit rate is reduced down to, for example, a few Mbps. Although a plurality of kinds of systems as well as MPEG4 exist as encoding systems for forming the auxiliary AV data, in the embodiment of the invention, the auxiliary AV data encoded by a plurality of different kinds of encoding systems can exist mixedly on one disc. The auxiliary AV data encoded in the same encoding system by using different encoding parameters can also exist mixedly on one disc.

In the embodiment of the invention, the number of channels of the audio data which is handled in the auxiliary AV data is fixed to 8 channels. That is, for example, the number of channels of the audio data in the auxiliary AV data is set to 8 channels and, assuming that in the audio data of the main line system mentioned above, even in the case where either 0 channel or 4 channels is selected as recording channels or the case where the number of input channels is further smaller than that of the selected recording channels, the number of channels of the audio data in the auxiliary AV data is equal to 8 channels. If the number of recording channels of the audio data of the main line system is less than 8 channels, the audio data showing the silence is recorded into the residual channels of the audio data in the auxiliary AV data (that is, the channels which do not correspond to the channels of the audio data of the main line system).

The meta data is upper data regarding certain data and functions as an index to show the contents of various data. As meta data, there are two kinds of data of time-sequential meta data which is generated along a time series of the AV data of the main line system mentioned above and non-time-sequential meta data which is generated for a predetermined interval such as every scene in the AV data of the main line system.

In the time-sequential meta data, for example, a time code, a UMID (Unique Material Identifier), and an essence mark are essential data. Further, camera meta information such as iris and zoom information of a video camera upon photographing can be also included in the time-sequential meta data. Moreover, information which is specified in ARIB (Association of Radio Industries and Businesses) can be also included in the time-sequential meta data. Since data sizes of the data based on ARIB and the camera meta information are relatively large, it is desirable that they exclusively exist mixedly. The camera meta information and the ARIB can be also included in the time-sequential meta data by time-division multiplex while reducing time resolution.

As non-time-sequential meta data, change point information such as time code or UMID, information regarding the essence mark, user bits, and the like are included.

The UMID will be schematically explained. The UMID is an identifier which is uniquely determined to identify the video data, audio data, and other material data and has been standardized by SMPTE-330M.

FIG. 1 shows a data structure of the UMID. The UMID is constructed by: a basic UMID as ID information to identify the material data; and signature meta data to identify the respective contents in the material data. Each of the basic UMID and the signature meta data has a data area having a data length of 32 bytes. An area having a data length of 64 bytes in which the signature meta data is added to the basic UMID is called an expansion UMID.

The basic UMID is constructed by: an area Universal Label (universal label) having a data length of 12 bytes; an area Length Value (length) having a data length of 1 byte; an area Instance Number (instance number) having a data length of 3 bytes; and an area Material Number (material number) having a data length of 16 bytes.

In the area Universal Label, a code to identify that a data train which continues just after is the UMID is stored. In the area Length Value, a length of the UMID is shown. Since a length of code of the basic UMID and that of the expansion UMID are different, in the area Length, the basic UMID is shown by a value [13h] and the expansion UMID is shown by a value [33h]. In the expression in the parentheses [ ], "h" after the numeral shows that the numeral is expressed by the hexadecimal notation. In the area Instance Number, whether or not an overwriting process or an editing process has been performed to the material data is shown.

The area Material Number comprises three areas of an area Time Snap (time snap) having a data length of 8 bytes, an area Rnd having a data length of 2 bytes, and an area Machine node (machine node) having a data length of 6 bytes. The area Time Snap shows the number of snap clock samples in one day. The time and the like of creation of the material data are shown by such a number on a clock unit basis. The area Rnd is a random number to prevent the number from being added so as to overlap when the incorrect time is set or when a network address of the apparatus defined by, for example, IEEE (Institute Electrical and Erectronic Engineers) changes.

The signature meta data is constructed by: an area Time/Date (time/date) having a data length of 8 bytes; an area Spatial Co-ordinated (spatial co-ordinated) having a data length of 12 bytes; and an area Country (country), an area Organization (organization), and an area User (user) each having a data length of 4 bytes.

In the area Time/Date, the time and date when the material is created are shown. In the area Spatial Co-ordinated, correction information (time difference information) regarding the time when the material is created and position information shown by a latitude, a longitude, and an altitude are shown. The position information can be obtained by, for example, providing a function corresponding to a GPS (Global Positioning System) to the video camera. In the area Country, the area Organization, and the area User, a country name, an organization name, and a user name are shown by using abbreviated alphabetical characters, symbols, and the like, respectively.

In the UMID, in the case of using the expansion UMID as mentioned above, the data length is equal to 64 bytes and a capacity is relatively large to time-sequentially record them. Therefore, when the UMID is embedded into the time-sequential meta data, it is preferable to compress the UMID in a predetermined system.

In the UMID, 10 to 13 bytes from the head are set to a fixed value so long as it is used in an application of the embodiment of the invention. Therefore, in the embodiment of the invention, 10 to 13 bytes from the head of the UMID can be omitted. When the UMID is stored into the time-sequential meta data, it can be encoded by a predetermined system. In this case, if Base64 is used as an encoding system, an encoding result is expressed by the ASCII code and the UMID can be easily embedded into, for example, an XML document, so that it is preferable. Further, it is also considered to use only the difference. For instance, the UMIDs a part of which are common are added to data which is generated in the same directory at the same time. By using such a method, the data amount can be reduced by using only the difference between the UMIDS.

The essence mark will now be schematically described. The essence mark shows an index associated with, for example, video scene data as a video scene (or cut) constructed in the video data upon photographing. By using the essence mark, what kind of scene was photographed can be grasped after the photographing without executing a reproducing process of the video scene data.

In the embodiment of the invention, the essence marks are previously defined as reservation words. Therefore, common control can be made, for example, among interfaces of an image pickup apparatus, a reproducing apparatus, and an editing apparatus without converting the essence mark in accordance with the partner apparatus.

FIG. 2 shows an example of the reservation words which are used to define the essence marks. FIG. 2 is shown as an example and further other essence marks can be also additionally defined. "_RecStart" is a photographing start mark showing a start position of the recording. "_RecEnd" is a photographing end mark showing an end position of the recording. "_ShotMark1" and "_ShotMark2" are shot marks showing arbitrary positions such as target time points or the like to which attention should be paid. "_Cut" is a cut mark showing a cutting position. "_Flash" is a flash mark showing a flash detecting position indicative of a position where a light emission of a flash has been performed. "_FilterChange" is a filter change mark showing a position where a lens filter has been changed in the image pickup apparatus. "_ShutterSpeedChange" is a shutter speed change mark showing a position where a shutter speed has been changed in the image pickup apparatus. "_GainChange" is a gain change mark showing a position where a gain of the filter or the like has been changed. "_WhiteBalanceChange" is a white balance change mark showing a position where a white balance has been changed. "_OverBrightness" is a mark showing a position where an output level of the video signal exceeds a limit value. "_OverAudioLimiter" is a large sound volume mark showing a position where an output level of the audio signal exceeds a limit value. Each of the foregoing marks is recorded, for example, on a frame unit basis of the video data.

"_In-XXX" is an editing start mark showing a cutting start position of a cut or a material. "_Out-XXX" is an editing end mark showing a cutting end position of the cut or the material. In the editing start mark and the editing end mark, a numeral, an alphabet, or the like is sequentially numbered to the portion of "XXX" each time an editing start point (IN point) and an editing end point (OUT point) are added. For example, they are shown like "_In-001", "_In-002", . . . .

By using the essence marks defined as mentioned above as index information at the time of a coarse editing process, a target video scene can be efficiently selected.

Figure 3:
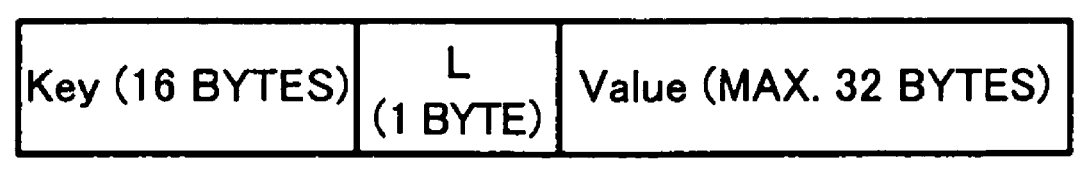

FIG. 3 shows a data structure of an example of the essence marks. As described by using FIG. 2, the essence mark is meta data in which a feature or the like of the video scene is expressed by text data and which is associated with video contents data (AV data of the main line system). The essence mark is KLV (Key Length Value) encoded, recorded, and transmitted. FIG. 3 shows a format of the KLV-encoded essence mark. This format conforms with a meta data dictionary of SMPTE 335M/RP210A.

The KLV-encoded essence mark comprises a "Key" portion having a data length of 16 bytes, an "L (length)" portion having a data length of 1 byte, and a "Value" portion having a data length of maximum 32 bytes. The "Key" portion is an identifier which conforms with SMPTE 335M/RP210A and shows a KLV-encoded data item. In this example, it is set to a value showing the essence mark. The "L" portion shows a data length subsequent to the "L" portion on a byte unit basis. The data length of maximum 32 bytes is expressed. The "Value" portion is an area comprising the text data in which the essence mark is stored.

A data layout onto the disc according to the embodiment of the invention will now be described. In the embodiment of the invention, the data is recorded so as to form annual rings onto the disc. The annual ring data is data which is recorded onto the disc by using a data amount shown by a reproducing time of the data as a unit. For example, when explaining by limiting to the audio data and the video data of the main line system, the audio data and the video data in which reproducing time zones correspond to each other are alternately arranged and recorded every predetermined reproducing time unit having a data size of one circumference or more of a track. By recording as mentioned above, a set of the audio data and the video data in which the reproducing time zones correspond to each other is time-sequentially multiplexed and the annual ring is formed.

In the embodiment, actually, in addition to the audio data and the video data in which the reproducing time zones correspond to each other, the auxiliary AV data and the time-sequential meta data in which the reproducing time zones correspond to each other are recorded as a set to those data, thereby forming the annual ring and recording the data onto an optical disc 1.

The data which forms the annual ring is called annual ring data. The annual ring data is set to a data amount that is integer times as large as that of a sector as a minimum recording unit on the disc. The annual ring is recorded so that its boundary coincides with that of the sector of the disc.

FIG. 4 shows a state of an example in which the annual ring data has been formed on the optical disc 1. In the example of FIG. 4, audio annual ring data #1, video annual ring data #1, audio annual ring data #2, video annual ring data #2, auxiliary AV annual ring data #1, and time-sequential meta annual ring data #1 are recorded in order from the inner rim side of the optical disc 1. The annual ring data is handled at such a period. A part of the annual ring data of the next period is further shown as audio annual ring data #3 and video annual ring data #3 on the outer rim side of the time-sequential meta annual ring data #1.

The example of FIG. 4 shows that the reproducing time zone of one annual ring data of the time-sequential meta annual ring data corresponds to the reproducing time zone of one annual ring data of the auxiliary AV annual ring data and the reproducing time zone of one annual ring data of the time-sequential meta annual ring data corresponds to the reproducing time zone of two periods of the audio annual ring data. Similarly, it shows that the reproducing time zone of one annual ring data of the time-sequential meta annual ring data corresponds to the reproducing time zone of two periods of the video annual ring data. The correspondence of the reproducing time zone and the period of each annual ring data as mentioned above is set on the basis of, for example, each data rate or the like. It is preferable that the reproducing time of one annual ring data of each of the video annual ring data and the audio annual ring data is equal to about 1.5 to 2 seconds as an experience value.

FIGS. 5A and 5B show a state of an example in which data is written and read out onto/from the optical disc 1 on which the annual rings have been formed as shown in FIG. 4 mentioned above. In the case where continuous empty areas of a sufficient size exist on the optical disc 1 and there is no defect in the empty areas, as shown in the example of FIG. 5A, the audio annual ring data, the video annual ring data, the auxiliary AV annual ring data, and the time-sequential meta annual ring data formed on the basis of the reproducing time zones from the data series of the audio data, the video audio data, the auxiliary AV data, and the time-sequential meta data are written into the empty areas on the optical disc 1 as if they were drawn with a single stroke onto the empty areas on the optical disc 1. At this time, they are written so that a boundary of any data coincides with that of the sectors on the optical disc 1. The reading of the data from the optical disc 1 is also executed in a manner similar to that upon writing.

In the case of reading out a certain specific data series from the optical disc 1, the operation to seek a pickup to a recording position of the read-out data series and read out the data is repeated. FIG. 5B shows a state where the series of auxiliary AV data is selectively read out as mentioned above. Also with reference to FIG. 4, for instance, if the auxiliary AV annual ring data #1 is read out, the time-sequential meta annual ring data #1, audio annual ring data #3 and video annual ring data #3, and audio annual ring data #4 (not shown) and video annual ring data #4 (not shown) which were subsequently recorded are jumped by seeking. Auxiliary AV annual ring data #2 of the next period is read out.

As mentioned above, by using the reproducing time as a unit and periodically executing the recording of the data onto the optical disc 1 as annual ring data corresponding to the reproducing time zone, the audio annual ring data and the video annual ring data of the similar reproducing time zone are arranged in near positions on the optical disc 1. Therefore, the audio data and the video data whose reproducing time corresponds to each other can be promptly read out and reproduced from the optical disc 1. Since they are recorded so that the boundary of the annual rings and that of the sectors coincide, only the audio data or the video data can be read out from the optical disc 1 and only the audio data or the video data can be promptly edited. As mentioned above, each of the audio annual ring data, video annual ring data, auxiliary AV annual ring data, and time-sequential meta annual ring data has the data amount that is integer times as large as that of the sector on the optical disc 1 and is recorded so that the boundary of the annual rings and that of the sectors coincide. Therefore, if only the data of one series among the audio annual ring data, video annual ring data, auxiliary AV annual ring data, and time-sequential meta annual ring data is necessary, only the necessary data can be read out without reading out the other data.

To effect use convenience of the data layout by the annual rings as mentioned above, the recording of the data to the optical disc 1 needs to be executed so that the continuity of the annual rings is guaranteed. This point will be described with reference to FIGS. 6A, 6B, and 6C. For example, a case where only the auxiliary AV annual ring data (shown as "LR" in FIGS. 6A, 6B, and 6C) is read out is now considered.

Figure 6A:
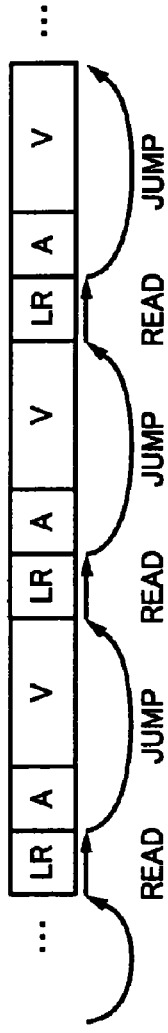
FIGS. 6A, 6B, and 6C are diagrams for explaining how the data is recorded so that continuity of the annual rings is guaranteed.

For example, if the continuous empty areas of the sufficiently large size are assured upon recording, annual rings of a plurality of periods can be continuously recorded. In this case, as shown in FIG. 6A, the auxiliary AV annual ring data which continues with respect to the time can be read out by the minimum track jump. That is, such an operation that, after the auxiliary AV annual ring data is read out, auxiliary AV annual ring data in the annual rings of the next period are read out can be repeated, a distance at which the pickup jumps becomes the shortest.

Figure 6B:
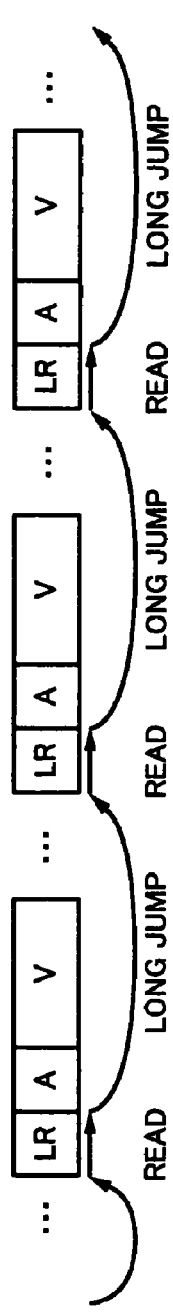
Figure 6C:
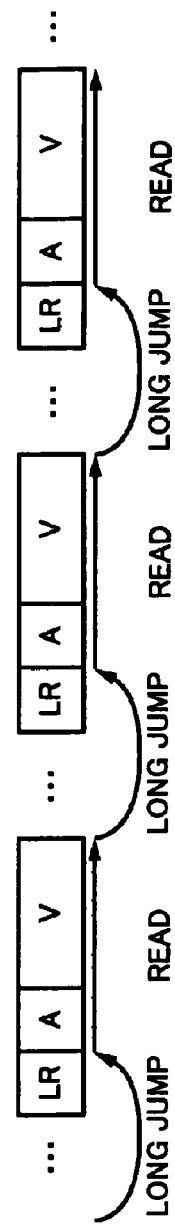

On the other hand, in the case where the continuous empty areas cannot be assured upon recording and the auxiliary AV data which is continuous with respect to the time is recorded, as shown in an example in FIG. 6B, after the first auxiliary AV annual ring data is read out, the pickup has to jump the distance corresponding to, for example, a plurality of periods of the annual rings and read out the next auxiliary AV annual ring data. Since this operation is repeated, a reading speed of the auxiliary AV annual ring data decreases more than that in the case shown in FIG. 6A. In the AV data of the main line system, as shown in an example in FIG. 6C, there is a possibility that the reproduction of the AV data (AV clip) which is not edited yet is delayed.

Therefore, in the embodiment of the invention, in order to guarantee the continuity of the annual rings, an allocation unit having a length of a plurality of periods of the annual rings is defined and, when the data is recorded by the annual rings, continuous empty areas of a length exceeding an allocation unit length defined by the allocation unit are assured.

This will be more specifically explained with reference to FIGS. 7A and 7B. The allocation unit length is preset. The allocation unit length is set to a value that is plural times as large as the total reproducing time of the respective data which is recorded for one period in the annual ring. For example, assuming that the reproducing time corresponding to one period of the annual ring is equal to 2 seconds, the allocation unit length is set to 10 seconds. The allocation unit length is used as a measure for measuring a length of the empty areas on the optical disc 1 (refer to upper right portion in FIG. 7A). As shown in an example in FIG. 7A, an initial state is assumed to be the state where the used areas are arranged in three positions on the optical disc 1 without order and the portions sandwiched between the used areas are the empty areas.

In the case of recording the AV data having a certain length and the auxiliary AV data corresponding to the AV data onto the optical disc 1, first, the allocation unit length is compared with the length of empty area and the empty area having the length which is equal to or longer than the allocation unit length is assured as a reservation area (FIG. 7B). In the example of FIG. 7A, the right one of the two empty areas is set to be longer than the allocation unit length and assured as a reservation area. Subsequently, the annual ring data is sequentially continuously recorded from the head of the reservation area into the reservation area (FIG. 7C). The annual ring data is recorded as mentioned above and when the length of empty area of the reservation area is less than the length of one period of the annual ring data to be recorded next (FIG. 7D), the reservation area is opened. While the allocation unit length is applied to further another empty area on the optical disc 1 as shown in FIG. 7A, the empty areas which can be used as reservation areas are searched for.

By searching for the empty areas in which the annual rings of a plurality of periods can be recorded and recording the annual rings into the empty areas, the continuity of the annual rings of a certain extent is guaranteed. The annual ring data can be smoothly reproduced. Although the allocation unit length has been set to 10 seconds in the above example, it is not limited to this example but a length corresponding to the further long reproducing time can be set as an allocation unit length. Actually, it is desirable to set the allocation unit length to a value between 10 to 30 seconds.

A management structure of the data in the embodiment of the invention will now be described with reference to FIGS. 8 to 11. In the embodiment of the invention, the data is managed by a directory structure. For example, a UDF (Universal Disk Format) is used as a file system. As shown in an example in FIG. 8, a directory PAV is provided just under a root directory (root). In the embodiment, this directory PAV and subsequent directories are defined.

That is, the mixture recording of the audio data and the video data of a plurality of signal kinds onto one disc is defined under the domination of this directory PAV. The recording of the data to the directory PAV to which the data management in the embodiment of the invention is not made is arbitrarily performed.

Four files (INDEX.XML, INDEX.RSV, DISCINFO.XML, and DISCINFO.RSV) are provided and two directories (CLPR and EDTR) are provided just under the directory PAV.

The directory CLPR manages clip data. The clip mentioned here denotes, for example, a bundle of data until the photographing is stopped after it is started. For example, in the operation of a video camera, the data until an operation stop button is depressed (an operation start button is released) after the operation start button is depressed is set to one clip.

The bundle of data comprises: the audio data and the video data of the main line system mentioned above; the auxiliary AV data formed from the audio data and the video data; and the time-sequential meta data and the non-time-sequential meta data corresponding to the audio data and the video data. The bundle of data constructing the clip is stored every clip into directories "C0001", "C0002", . . . provided just under the directory CLPR.

Figure 9:
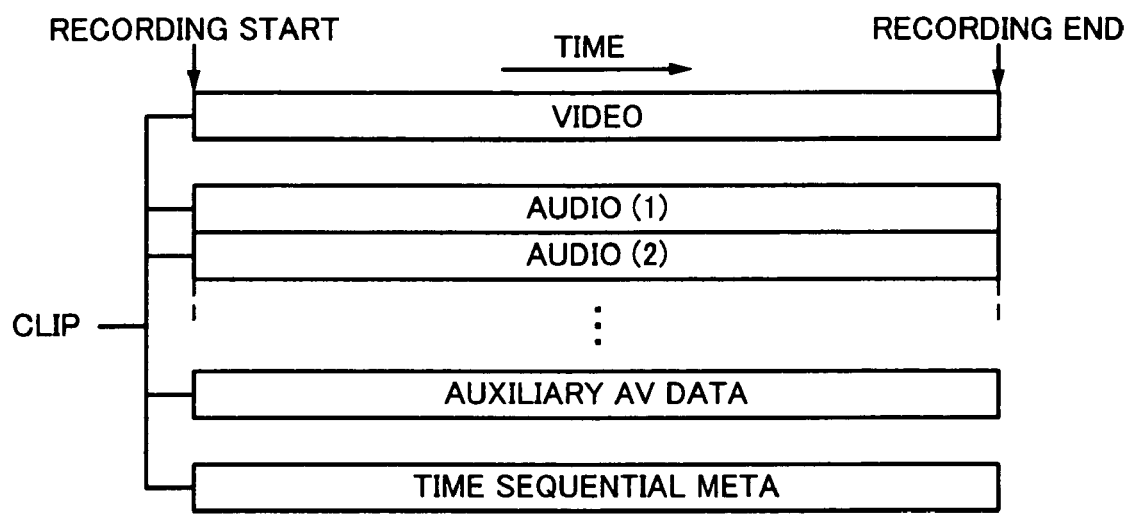
FIG. 9 is a schematic diagram schematically showing a structure of a clip.

That is, as shown in an example in FIG. 9, the clip is constructed by: the video data having a common time base until the end of the recording after it is started; the audio data (1), (2), . . . of the channels; the auxiliary AV data; the time-sequential meta data; and the non-time-sequential meta data. The non-time-sequential meta data is omitted in FIG. 9.

Figure 10:
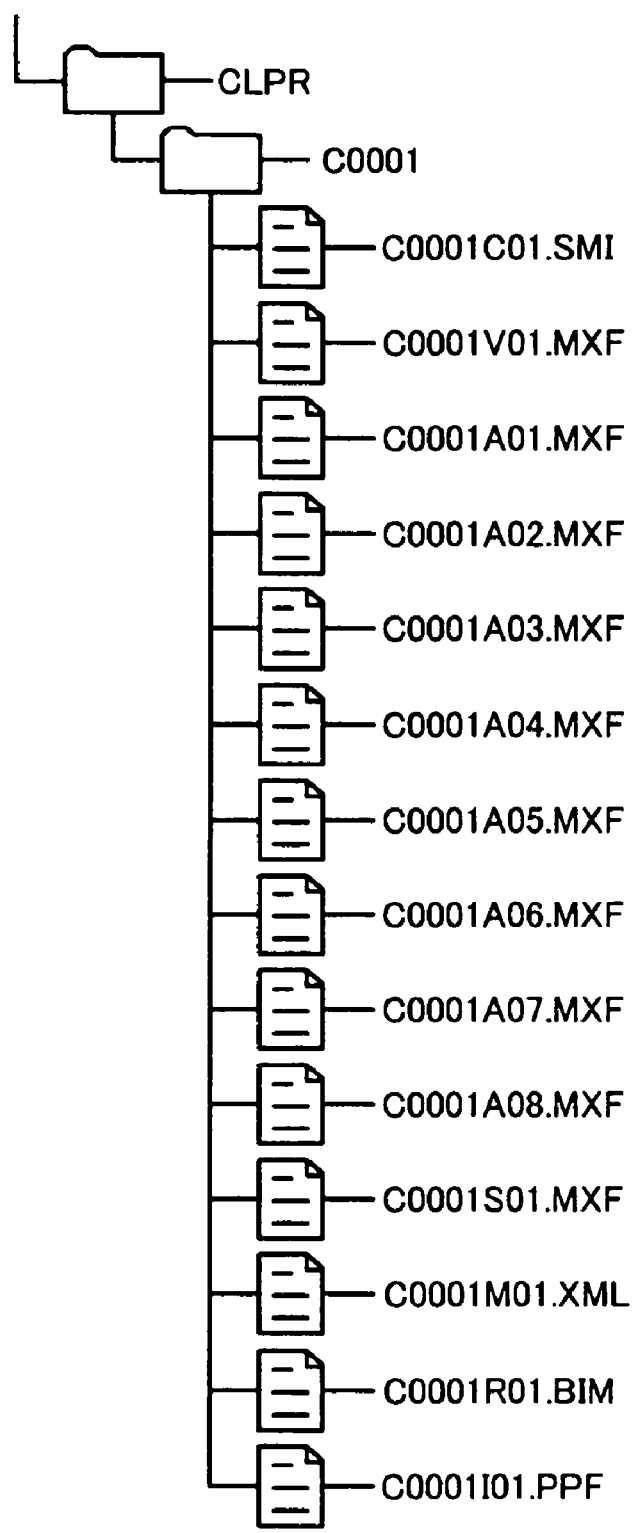
FIG. 10 is a diagram for explaining the management structure of the data in the embodiment of the invention.

FIG. 10 shows a structure of an example of the directory "C0001" corresponding to one clip "C0001" provided just under the directory CLPR. The directory corresponding to one clip just under the directory CLPR is properly referred to as a clip directory. A construction of the clip directory almost corresponds to a construction of FIG. 9 mentioned above. That is, the bundles of data mentioned above are distinguished by file names and stored for the clip directory "C0001", respectively. In the example of FIG. 10, the file name is constructed by 12 digits. The former 5 digits among 8 digits before a delimiter "." are used to discriminate the clip, 3 digits just before the delimiter are used to show a type of data such as audio data, video data, or auxiliary AV data, and 3 digits after the delimiter are used as an extension and show the format of the data.

More specifically speaking, in the example of FIG. 10, as bundles of files constructing the clip "C0001", a file "C0001C01.SM1" showing clip information, a main line system video data file "C0001V01.MXF", audio data files "C0001A01.MXF" to "C0001A08.MXF" of 8 channels of the main line system, an auxiliary AV data file "C0001S01.MXF", a non-time-sequential meta data file "C0001M01.XML", a time-sequential meta data file "C0001R01.BIM", and a pointer information file "C0001I01.PPF" are stored in the clip directory "C0001".

As mentioned above, in the embodiment of the invention, the audio data of the main line system is stored into the files ("C0001A01.MXF" to "C0001A08.MXF") every channel and recorded. At this time, if the audio data of a channel pair is recorded as a unit, an effect such as reduction in accessing time upon reproduction or the like can be expected and it is more preferable. For example, the files having a relation of the channel pair are arranged in the positions which are physically close on the disc.

In the embodiment of the invention, the mixed existence of the data signal kinds between the clip directory in the directory CLPR is permitted. For example, with respect to the signal kind of the video data of the main line system, the video data of the single GOP and the bit rate of 50 Mbps can be stored in the clip directory "C0001" and the video data of the long GOP and the bit rate of 25 Mbps can be stored in the clip directory "C0002". On the other hand, the mixed existence of the data signal kinds in each data in the clip directory is not permitted. For example, it is assumed that in the video data, such a video data file that the data from the head to a certain time point has been recorded in the bit rate mode of 50 Mbps and the data from this time point to the end has been recorded in the bit rate mode of 25 Mbps cannot be stored.

Figure 8:
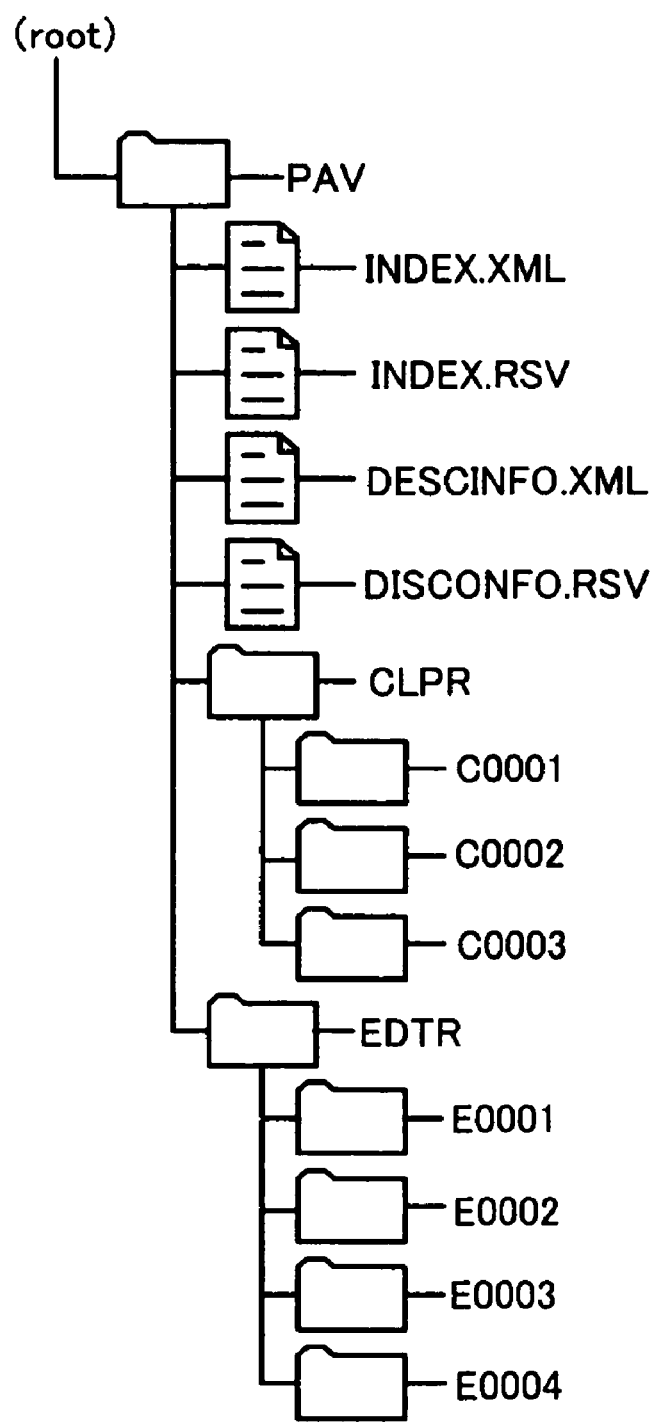
FIG. 8 is a diagram for explaining a management structure of data in an embodiment of the invention.

Explanation will be returned to FIG. 8 and the edit information is managed in the directory EDTR. In the embodiment of the invention, the edition result is recorded as an edit list or a play list. The bundles of data constructing the edition result are stored every edition result into directories "E0001", "E0002", . . . provided just under the directory EDTR.

The edit list is a list on which edit points (IN point, OUT point, etc.) for the clip, reproducing order, and the like are described and comprises a non-destructive edition result for the clip and a play list, which will be explained hereinafter. When the non-destructive edition results on the edit list are reproduced, a continuous reproduction video image is obtained from a plurality of clips as if one edited stream were reproduced with reference to the files stored in the clip directory in accordance with the description on the list. However, according to a non-destructive edition result, since the files on the list are referred to irrespective of the positions of the files on the optical disc 1, the continuity upon reproduction is not guaranteed.

According to the play list, on the basis of the edition result, if it is determined to be difficult to continuously reproduce the files to be referred to by the list or the portions of the files, by rearranging those files or a part of the files into a predetermined area on the optical disc 1, the continuity of the edit list upon reproduction is guaranteed.

On the basis of the result in which the foregoing edit list was formed by the editing operation, by referring to management information of the file which is used for editing (for example, an index file "INDEX.XML", which will be explained hereinafter), whether or not the continuous reproduction can be performed on the basis of the editing operation in the non-destructive state, that is, in the state where the file which is referred to on the basis of the edition result is held in each clip directory is estimated. Thus, if the continuous reproduction is determined to be difficult, the relevant file is copied into a predetermined area on the optical disc 1. The file arranged in this predetermined area is called a bridge essence file. A list in which the bridge essence file is reflected to the edition result is called a play list.

For example, in the case where the edition result is constructed so as to refer to a complicated clip, at the time of the reproduction based on the edition result, there is a possibility of occurrence of such a situation that the seeking operation of the pickup is not in time when shifting from the clip to another clip in such a case, the play list is formed and the bridge essence file is recorded into the predetermined area on the optical disc 1.

Figure 11:
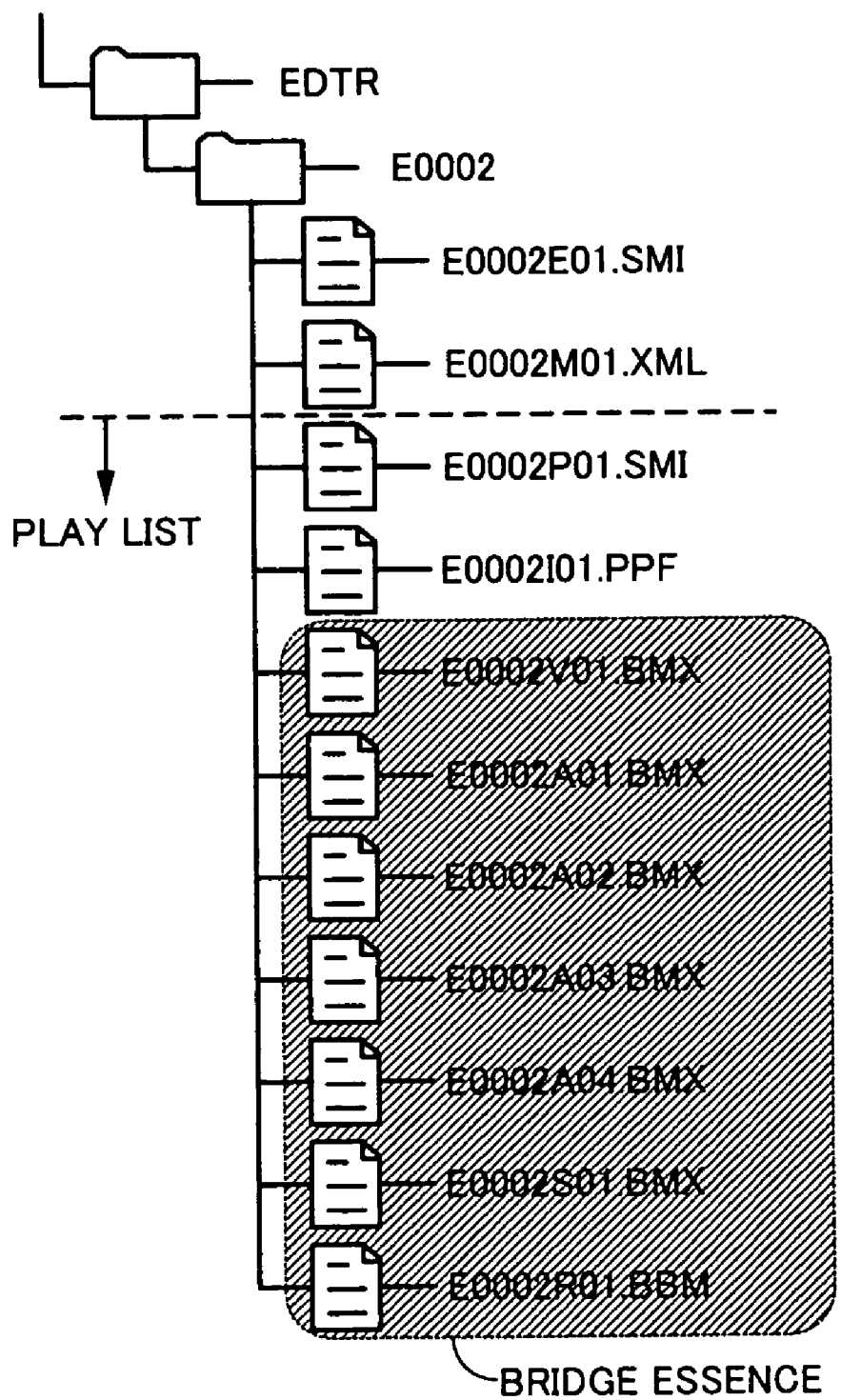
FIG. 11 is a diagram for explaining the management structure of the data in the embodiment of the invention.

FIG. 11 shows a structure of an example of the directory "E0002" corresponding to one edition result "E0002" provided just under the directory EDTR. The directory corresponding to one edition result just under the directory EDTR is properly called an edit directory hereinbelow. The data formed by the above edition results is distinguished by a file name and stored into the edit directory "E0002". The file name is constructed by 12 digits. The former 5 digits among 8 digits before a delimiter "." are used to discriminate the editing operation, 3 digits just before the delimiter are used to show a type of data, and 3 digits after the delimiter are an extension and show the format of the data.

More specifically speaking, in the example of FIG. 11, as files constructing the edition result "E0002", an edit list file "E0002E01.SM1", a file "E0002M01.XML" in which the information of the time-sequential meta data and the non-time-sequential meta data is described, a play list file "E0002P01.SMI", bridge essence files "E0002V01.BMX" and "E0002A01.BMX" to "E0002A04.BMX" by the data of the main line system, a bridge essence file "E0002S01.BMX" by the auxiliary AV data, and a bridge essence file "E0002R01.BMX" by the time-sequential meta data and the non-time-sequential meta data are stored into the edit directory "E0002".

The files shown in a hatched region among the files which are stored in the edit directory "E0002", that is, the bridge essence files "E0002V01.BMX" and "E0002A01.BMX" to "E0002A04.BMX" by the main line system data, the bridge essence file "E0002S01.BMX" by the auxiliary AV data, and the bridge essence file "E0002R01.BMX" by the time-sequential meta data and the non-time-sequential meta data are the files belonging to the play list.

As mentioned above, for example, the video data stored in the clip directory is referred to by the edit list. Since the data of different data signal kinds can exist mixedly between the clip directories, eventually, the different data signal kinds can exist mixedly on the edit list.

Explanation will be returned to FIG. 8. The file "INDEX.XML" is an index file to manage the material information stored in the directory PAV and subsequent directories. In this example, the file "INDEX.XML" is described in an XML (Extensible Markup Language) format. The foregoing clips and edit list are managed by the file "INDEX.XML". For example, a conversion table of the file names and the UMIDs, length information (Duration), reproducing order of the materials when the whole optical disc 1 is reproduced, and the like are managed. The video data, audio data, auxiliary AV data, and the like belonging to each clip are managed and the clip information which is managed by the files is managed in the clip directory.

In the file "DISCINFO.XML", the information regarding the disc is managed. Reproducing position information or the like is also stored in this file "DISCINFO.XML".

In the embodiment of the invention, if a predetermined change is detected in the bundle of data constructing the clip for a time interval from the start of the photographing to the stop thereof, the clip is divided at the position corresponding to the change detecting position and the data after the dividing position is set to a new clip. A new directory corresponding to the new clip is automatically formed for the directory CLPR. A bundle of data constructing the new clip is stored into the formed directory.

The clip division is executed in the case where a change in signal kind (format) is detected in one of the video data and the audio data constructing the clip. More specifically speaking, the following examples are considered as dividing conditions. First, with respect to the video data, there are the following conditions.
 (1) change in bit rate
 (2) change in frame rate
 (3) change in image size
 (4) change in aspect ratio of the image
 (5) change in encoding system With respect to the audio data, there are the following conditions.
 (1) change in bit resolution
 (2) change in sampling frequency
 (3) change in the number of input channels
 (4) change in encoding system When the change is detected in one of them, the clip is automatically divided in the position corresponding to the timing when the change is detected. At this time, if the change is detected in certain data, another data belonging to the same clip as that of this data is also divided at the same timing.

The clip division is not limited to the above conditions but can be also performed in accordance with changes in further other attributes of the video data and the audio data. The invention is not limited to the video data and the audio data but it is also possible to detect a predetermined change in the auxiliary AV data or the time-sequential meta data and divide the clip.

For example, with respect to the auxiliary AV data, for example, the clip can be divided when the bit rate mode or the encoding system is changed. With respect to the time-sequential meta data, for instance, in the case where the meta data and the camera data by the ARIB are exclusively recorded or if there is a change in data kind between the ARIB and the camera data the clip can be divided. Further, the clip can be also divided when the data rate which has initially been set in order to transmit the time-sequential meta data is changed.

Moreover, it is also possible to construct in such a manner that at the time of the clip division accompanied with the change in video data of the main line system, the audio data of the main line system and the time-sequential meta data are not divided. By this method, an increase in number of files due to the clip division can be suppressed. Also in this case, the auxiliary AV data is divided in association with the change in video data of the main line system.

Figure 12A:
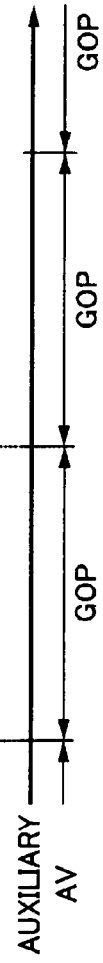
FIGS. 12A and 12B are diagrams for explaining how a boundary of clip division is made to coincide with that of GOPs of auxiliary AV data.

At the time of the clip division, when the boundary of the division is made coincide with that of the GOP of the auxiliary AV data, the relation between the time base in the clip and a byte offset becomes simple, so that the process becomes easy and it is preferable. Such a process is executed by a method whereby, for example, when the above-mentioned change is detected in the video data and the audio data, as shown in an example in FIG. 12A, the clip division is waited up to the next GOP boundary of the auxiliary AV data (dividing position B) or the clip division is executed while tracing back to the previous GOP boundary (dividing position A). Actually, it is preferable to divide the clip in the dividing position B.

Figure 12B:
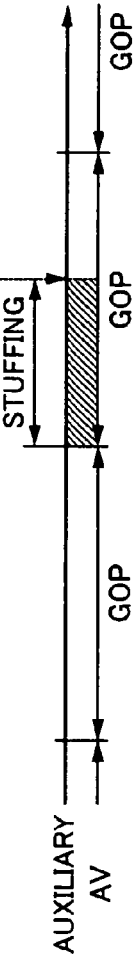

The invention is not limited to the above method but there is also a method whereby when the boundary of the division at the time of the clip division does not coincide with the GOP boundary of the auxiliary AV data, the surplus portions of the GOP of the auxiliary AV data are filled with stuffing bytes and a data amount of the auxiliary AV data is equalized with that of another data such as video data of the main line system or the like. That is, as shown in an example in FIG. 12B, in the auxiliary AV data, for example, the GOP just before the position where the change is detected in the video data is set to the last GOP of this clip and the portion from the boundary at a rear edge of the last GOP to the change detecting position (shown by a hatched region in FIG. 12B) is filled with the stuffing bytes.

If the video data of the main line system is the single GOP, the clip can be divided at an arbitrary frame position. On the other hand, if the video data of the main line system is the long GOP, there is a possibility that the frame at the clip dividing position is a frame based on a P picture or a B picture by the predictive encoding. Therefore, in the case of performing the clip division to the video data of the long GOP, the GOP is completed once at the clip dividing position. Such a process can be realized by converting the frame just before the dividing position into the P picture or the I picture so long as the frame is the B picture.

At the time of the clip division, the original clip for the division and the clip which is newly formed by the division can be also allowed to have an overlap portion. For example, in the original clip for the division and/or the new clip, the clip division is performed with an extra time for the change timing so as to include the change point of the signal kind with respect to the time.

Figure 13:
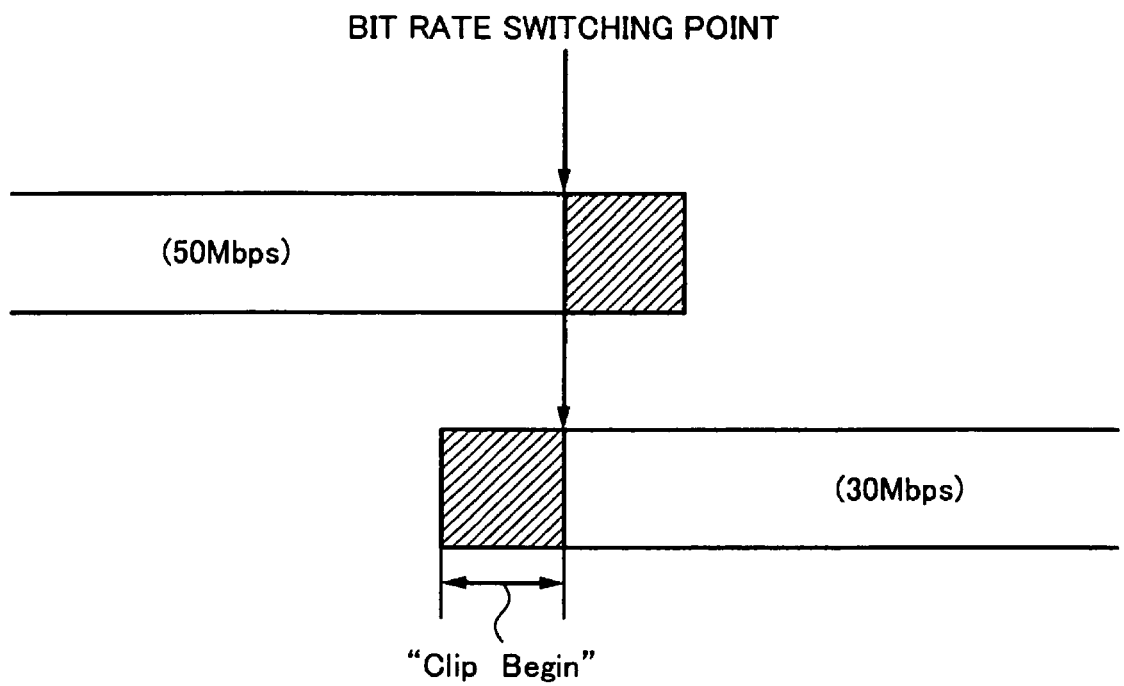
FIG. 13 is a diagram for explaining how an original clip and a clip which is newly formed by the division are allowed to have an overlap portion at the time of the clip division.

For example, in the video data of the main line system, a case where the initial bit rate 50 Mbps is switched to 30 Mbps will be described with reference to FIG. 13. As shown in FIG. 13, in the video data whose bit rate is equal to 50 Mbps, the data is recorded while keeping the bit rate of 50 Mbps for an predetermined extra time (hatched portion in the diagram) from the position where the switching of the bit rate is instructed. In the video data whose bit rate is equal to 30 Mbps, the data is recorded at the bit rate of 30 Mbps from the timing that is preceding by a predetermined time (hatched portion in the diagram) to the position where the switching of the bit rate is instructed.

Since the bit rate switching point becomes the clip dividing position, it is necessary to adjust the clip start position for the head position of the actual file by using, for example, "clip Begin" as a command to designate the start position of the clip.

Such a recording can be realized by a method whereby, for example, in the video data of a base band before the compression encoding, hatched portions in FIG. 13 are buffered and compression encoded at the corresponding bit rates, respectively. For example, in the video data of 50 Mbps, such a recording can be realized by adding the file of the hatched portion to the file according to the video data before the bit rate switching point. In this case, it is not always necessary to actually add the file but a message showing such an addition can be also described onto the foregoing edit list or in the file "C0001Co1.SMI" showing the clip information in the clip directory.

A naming rule of the clip directory name and the file name of each file in the clip directory is not limited to the foregoing example. For instance, the UMIDs mentioned above can be also used as a file name and a clip directory name. As mentioned above, when considering up to the foregoing expansion UMID, the data length of the UMID is equal to 64 bytes and it is too long to be used as a file name. Therefore, it is desirable to use only a part of the UMID. For example, a portion in the UMID where different values can be obtained every clip is used as a file name or the like.

When the clip is divided, if the clip directory name and the file name are named so as to reflect the dividing reasons of the clip, it is preferable in terms of management of the clip. In this case, they are named so that it is possible to discriminate at least whether the clip division has explicitly been performed by the user or has been executed by an automatic process on the apparatus side.

FIG. 14 shows a construction of an example of a disc recording and reproducing apparatus 10 which can be applied to the embodiment of the invention. It is assumed here that the disc recording and reproducing apparatus 10 is a recording and reproducing unit built in the video camera (not shown). A video signal based on an image pickup signal of an object photographed by the video camera and an audio signal inputted in association with the photographing are inputted to a signal processing unit 31 and supplied to the disc recording and reproducing apparatus 10. The video signal and the audio signal outputted from the signal input/output unit 31 are supplied to, for example, a monitoring apparatus.

Naturally, the above construction is shown as an example and the disc recording and reproducing apparatus 10 can be also constructed as an apparatus which is independently used. For example, it can be also combined with a video camera without a recording unit and used. The video signal and the audio signal outputted from the video camera, a predetermined control signal, and data are inputted to the disc recording and reproducing apparatus 10 through the signal input/output unit 31. For instance, a video signal and an audio signal reproduced by another recording and reproducing apparatus can be also inputted to the signal input/output unit 31. The audio signal which is inputted to the signal input/output unit 31 is not limited to the signal which is inputted in association with the photographing of the video signal but can be also replaced by an after-recording audio signal for after-recording to record the audio signal into a desired interval of the video signal, for example, after the photographing.

A spindle motor 12 rotates the optical disc 1 at a CLV (Constant Linear Velocity) or a CAV (Constant Angler Velocity) on the basis of a spindle motor driving signal from a servo control unit 15.

A pickup unit 13 controls a power of a laser beam on the basis of a recording signal which is supplied from the signal processing unit 16 and records the recording signal onto the optical disc 1. The pickup unit 13 converges the laser beam and irradiates it onto the optical disc 1. The pickup unit 13 photoelectrically converts reflection light from the optical disc 1, forms a current signal, and supplies it to an RF (Radio Frequency) amplifier 14. An irradiating position of the laser beam is controlled to a predetermined position by a servo signal which is supplied from the servo control unit 15 to the pickup unit 13.

The RF amplifier 14 forms a focusing error signal, a tracking error signal, and a reproduction signal on the basis of the current signal from the pickup unit 13, supplies the tracking error signal and the focusing error signal to the servo control unit 15, and supplies the reproduction signal to the signal processing unit 16.

The servo control unit 15 controls a focusing servo operation and a tracking servo operation. Specifically speaking, the servo control unit 15 forms a focusing servo signal and a tracking servo signal on the basis of the focusing error signal and the tracking error signal from the RF amplifier 14, respectively, and supplies them to an actuator (not shown) of the pickup unit 13. The servo control unit 15 also forms a spindle motor driving signal for driving the spindle motor 12 and controls a spindle servo operation to rotate the optical disc 1 at a predetermined rotational speed.

Further, the servo control unit 15 makes sled control for moving the pickup unit 13 in the radial direction of the optical disc 1 and changing the irradiating position of the laser beam. The setting of the signal reading position on the optical disc 1 is performed by a control unit 20 and the position of the pickup unit 13 is controlled so that the signal can be read out from the set reading position.

The signal processing unit 16 modulates recording data which is inputted from a memory controller 17, forms the recording signal, and supplies it to the pickup unit 13. The signal processing unit 16 demodulates the reproduction signal from the RF amplifier 14, forms reproduction data, and supplies it to the memory controller 17.

The memory controller 17 controls a write address to a memory 18 and properly stores the recording data supplied from a data converting unit 19 into the memory 18. The memory controller 17 controls a read address to the memory 18, properly reads out the data stored in the memory 18, and supplies it to the signal processing unit 16. Similarly, the memory controller 17 properly stores the reproduction data from the signal processing unit 16 into the memory 18, reads out the data stored in the memory 18, and supplies it to the data converting unit 19.

The video signal and the audio signal based on the photographing image photographed by the video camera are supplied to the data converting unit 19 through the signal input/output unit 31. Although details will be explained hereinafter, in the data converting unit 19, the supplied video signal is compression encoded by using a compression encoding system such as MPEG2 or the like in the mode instructed by the control unit 20 and the video data of the main line system is formed. At this time, a compression encoding process of a lower bit rate is also executed and the auxiliary AV data is formed.

In the data converting unit 19, the supplied audio signal is compression encoded by the system instructed by the control unit 20 and outputted as audio data of the main line system. In the case of the audio signal, it can be also outputted as linear PCM audio data as it is without being compression encoded.

The audio data and the video data of the main line system and the auxiliary AV data which were processed as mentioned above in the data converting unit 19 are supplied to the memory controller 17.

The data converting unit 19 also decodes the reproduction data which is supplied from the memory controller 17 as necessary, converts it into an output signal of a predetermined format, and supplies it to the signal input/output unit 31.

The control unit 20 comprises a CPU (Central Processing Unit), memories such as ROM (Read Only Memory), RAM (Random Access Memory), and the like, a bus for connecting them, and the like and controls the whole disc recording and reproducing apparatus 10. An initial program which is read upon activation of the CPU, a program for controlling the disc recording and reproducing apparatus 10, and the like are previously stored in the ROM. The RAM is used as a work memory of the CPU. A video camera unit is also controlled by the control unit 20.

Further, a file system at the time of recording data onto the optical disc 1 and reproducing the recorded data in accordance with the programs which have previously been stored in the ROM is provided by the control unit 20. That is, in the disc recording and reproducing apparatus 10, the recording of the data to the optical disc 1 and the reproduction of the data from the optical disc 1 are performed under the management of the control unit 20.

An operation unit 21 is operated by, for example, the user and supplies an operation signal corresponding to the operation to the control unit 20. The control unit 20 controls the servo control unit 15, signal processing unit 16, memory controller 17, and data converting unit 19 on the basis of the operation signal from the operation unit 21, thereby allowing the recording and reproducing process to be executed.

For example, the setting and the like of the bit rate, frame rate, image size, and image aspect ratio to the recording video data are performed on the basis of the operation signal from the operation unit 21. Further, the setting of ON/OFF of the compression encoding process to the recording audio data and the bit resolution can be also executed from the operation unit 21. The control signals based on those settings are supplied to the memory controller 17 and the data converting unit 19.

Further, the number of recording channels of the audio data of the main line system can be set by the operation unit 21. The operation signal based on this setting is supplied from the operation unit 21 to the control unit 20. In the control unit 20, on the basis of the operation signal, a control signal to instruct that the audio data is recorded by the set number of recording channels is supplied from the control unit 20 to the signal processing unit 16, memory controller 17, data converting unit 19, and the like.

The disc recording and reproducing apparatus 10 has: an antenna 22 for receiving a signal by a GPS; and a GPS unit 23 for analyzing the GPS signal received by the antenna 22 and outputting position information comprising a latitude, a longitude, and an altitude. The position information outputted from the GPS unit 23 is supplied to the control unit 20. The antenna 22 and the GPS unit 23 can be provided for the video camera unit or can be also provided as devices which are externally attached to the outside of the disc recording and reproducing apparatus 10.

FIG. 15 shows a construction of an example of the data converting unit 19. Upon recording of the data to the optical disc 1, the recording signal inputted from the signal input/output unit 31 is supplied to a demultiplexer 41. The video signal of a motion image and the audio signal associated with the video signal are inputted to the signal input/output unit 31 from the video camera unit and photographing information of the camera, for example, information regarding an iris and a zoom is inputted as camera data in a real-time manner.

The demultiplexer 41 separates a plurality of related data series, that is, for example, the video signal of the motion image and the audio signal associated with the video signal from the signal which is supplied from the signal input/output unit 31 and supplies them to a data amount detecting unit 42. Further, the demultiplexer 41 separates the camera data from the signal which is supplied from the signal input/output unit 31 and outputs it. This camera data is supplied to the control unit 20.

The data amount detecting unit 42 supplies the video signal and the audio signal supplied from the demultiplexer 41 as they are to an image signal converting unit 43, an audio signal converting unit 44, and an auxiliary AV data converting unit 48, respectively, detects data amounts of the video signal and the audio signal, and supplies them to the memory controller 17. That is, with respect to each of the video signal and the audio signal which are supplied from the demultiplexer 41, the data amount detecting unit 42 detects, for example, the data amounts of the predetermined reproducing time and supplies them to the memory controller 17.

The image signal converting unit 43 compression encodes the video signal which is supplied from the data amount detecting unit 42 by, for example, the MPEG2 system in accordance with an instruction from the control unit 20 and supplies a data series of the video data which is thus obtained to the memory controller 17. For example, a maximum bit rate of a generation code amount by the compression encoding is set by the control unit 20. The image signal converting unit 43 estimates the data amount of one frame after the compression encoding, controls the compression encoding process on the basis of an estimation result, and executes the actual compression encoding process to the video data so that the generation code amount lies within the maximum bit rate. A difference between the set maximum bit rate and the data amount by the actual compression encoding is filled with, for example, predetermined padding data and the maximum bit rate is maintained. The data series of the compression encoded video data is supplied to the memory controller 17.

If the audio signal which is supplied from the data amount detecting unit 42 is not the linear PCM audio data, the audio signal converting unit 44 converts the audio signal into the linear PCM audio data in accordance with an instruction from the control unit 20. The invention is not limited to the above converting process but the audio signal converting unit 44 can also compression encodes the audio signal by, for example, an MP3 (Moving Pictures Experts Group 1 Audio Layer 3) system, an AAC (Advanced Audio Coding) system, or the like according to the MPEG system. The compression encoding system of the audio data is not limited to those systems but another system can be also used. The data series of the audio data which is outputted from the audio signal converting unit 44 is supplied to the memory controller 17.

The audio data of the main line system (that is, the audio signal which is supplied from the data amount detecting unit 42) is inputted, for example, as a channel pair in which one pair is constructed by two channels. As a transmission format of such audio data, for example, there is AES3-1992 (r1997) specified by AES (Audio Engineering Society). According to AES3-1992 (r1997), the audio data is serially transmitted by a channel pair in which samples are interleaved every channel.

Figure 16A:
FIGS. 16A, 16B, and 16C are schematic diagrams showing a data format of an example of audio data.
Figure 16B:
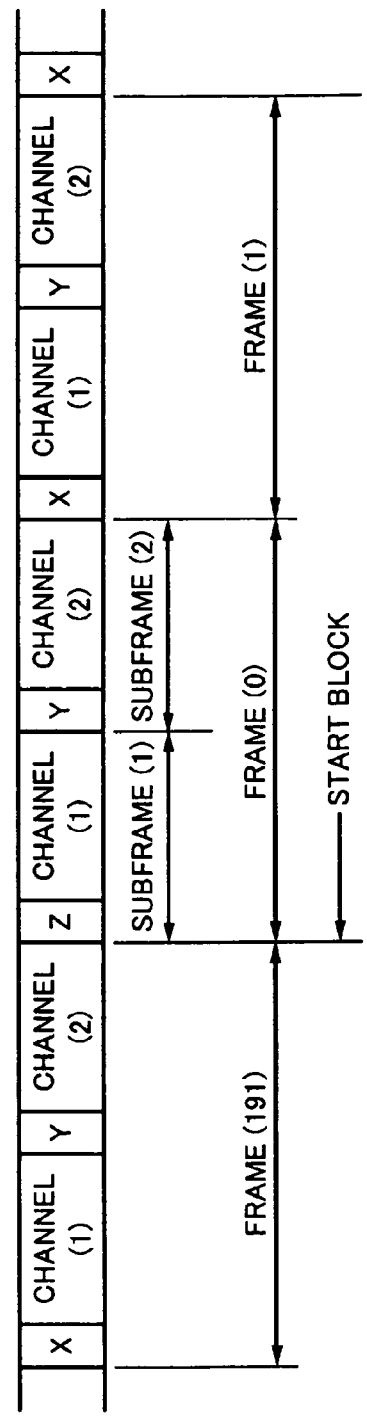

According to AES3-1992 (r1997), the audio data is stored every sample into a subframe. As shown in an example in FIG. 16A, in the subframe, a preamble consisting of a predetermined bit pattern is arranged in the 0th to 3rd bits. In this example in which the bit resolution consists of 24 bits, one sample of the audio data is stored into the 4th to 27th bits. Subsequent to the audio data, bits V, U, C, and P are arranged. Those bits V, U, C, and P are a validity bit, a user data bit, a channel status bit, and a parity bit, respectively. As shown in an example in FIG. 16B, one frame of the audio data is constructed by two subframes and one block is constructed by 192 frames.

The preamble which is arranged at the head of each subframe comprises a specific bit pattern. In the preambles of the first channel, a different value (assumed to be "Z") is used only for a start frame frame (0) of the block and, after that, the same value (assumed to be "X") is used for the frames (1) to (191). In all of the preambles of the second channel, the same value (assumed to be "Y") different from those of the preambles of the first channel is used for the frames. According to this format, by detecting the preambles, the start position of the block and the samples of the first and second channels can be discriminated.

Figure 16C:
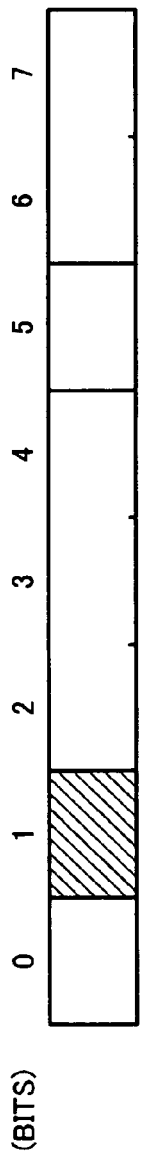

Channel status data is constructed by collecting channel status bits (C) corresponding to one block, that is, 192 bits (24 bytes) in which one bit is transmitted every subframe. Various attribute information and the like of the audio data which is transmitted are stored by using those 24 bytes. FIG. 16C shows the first one byte (the 0th byte) of the channel status data. The 0th bit indicates that this data is the channel status data. The 1st bit 1 (hatched portion in FIG. 16C) shows whether or not the data to be transmitted is the linear PCM audio data. In the 2nd to 4th bits, emphasis information of the audio data is stored. The 5th bit shows whether or not a sampling frequency of the audio data to be transmitted has been locked. The 6th and 7th bits show the sampling frequency of the audio data to be transmitted.

In the embodiment of the invention, when the linear PCM audio data is inputted, the audio data inputted as a channel pair is separated into the channels and the audio data of each channel is stored into the individual file and stored. The channel separating process of the audio data can be executed by, for example, the audio signal converting unit 44. For example, the preambles are detected on the basis of the bit pattern of the inputted audio data, the samples of the audio data of the first and second channels are extracted on the basis of the detected preambles, rearranged every channel, and outputted.

The audio data separated into the channels is supplied to the pickup unit 13 through the memory controller 17 and the signal processing unit 16 and recorded onto the optical disc 1 as an individual audio data file of each channel. By separating the audio data inputted in the state where one pair is constructed by two channels into the audio data of each channel and recording it, the process of the channel unit can be easily executed.

The channel separation of the audio data is not limited to the above example but can be also performed by using, for example, the memory 18 and the memory controller 17. The audio data stored in the memory 18 as a pair of two channels is read out in the inputted state while properly controlling the read address by the memory controller 17. For instance, the reading is controlled so as to arrange and output the samples of the same channel. The channel separation of the audio data can be also performed in the signal input/output apparatus 31.

In the embodiment of the invention, when the audio data is inputted by the channels of the number smaller than the set number of recording channels as mentioned above, the audio data indicative of the silence is outputted for the channels which are not used. As audio data indicative of the silence, for example, the audio data showing the silence of one sample is formed and stored into a memory, a register, or the like. By repetitively reading out it in accordance with clocks, the audio data showing the silence can be continuously outputted. Such a process can be executed by the audio signal converting unit 44. Naturally, it can be executed by using the memory 18 and the memory controller 17 or can be also executed by the signal input/output apparatus 31.

Further, according to the embodiment of the invention, in the case where the non-audio audio data is inputted as audio data of the main line system and recorded without being decoded into the linear PCM audio data, the channel separation is not performed. For example, according to AES3-1992 (r1997) mentioned above, it is determined so that data other than the linear PCM audio data can be also transmitted. Whether or not the data to be transmitted is the linear PCM audio data can be known by referring to the first bit in the first one byte of the channel status data as mentioned above with reference to FIG. 16C. If it is shown by the first bit that the data which is inputted is not the linear PCM audio data, the channel separation is not performed to this data. For example, the data is extracted one word by one from the subframe, arranged in order, and outputted.

The auxiliary AV data converting unit 48 compression encodes the video signal which is supplied from the data amount detecting unit 42 by, for example, the MPEG4 system in accordance with an instruction from the control unit 20 and forms the auxiliary AV data. In the embodiment, the bit rate is fixed to a few Mbps at this time, and the GOP is formed by ten frames of one I picture and nine P pictures.

As mentioned above, according to the embodiment of the invention, the audio data in the auxiliary AV data is always handled as audio data of 8 channels irrespective of the number of channels of the audio data of the main line system. In the auxiliary AV data converting unit 48, if the number of channels of the audio data which is supplied from the data amount detecting unit 42 is less than 8 channels, the audio data showing the silence is formed and encoded together with the video signal for the residual channels. The audio data indicative of the silence can be formed by, for example, storing one sample of the audio data showing the silence into, for example, the memory or the like and repetitively reading it out as mentioned above.

The above construction is shown as an example and is not limited to it. For example, if the AV data of the main line system, the camera data, and the like are independently inputted to the signal input/output unit 31, the demultiplexer 41 can be omitted. If the audio data of the main line system is the linear PCM audio data, the process in the audio signal converting unit 44 can be also omitted.

The video data and the audio data supplied to the memory controller 17 are supplied to the optical disc 1 and recorded as mentioned above.

The recording is performed while the annual rings are formed on the optical disc 1 as mentioned above. For example, when the audio data necessary for reproduction of the time corresponding to one annual ring data is detected in the audio data by the data amount detecting unit 42 of the data converting unit 19, the unit 42 notifies the memory controller 17 of such a fact. By receiving such a notification, the memory controller 17 discriminates whether or not the audio data necessary for reproduction of the amount corresponding to one annual ring data has been stored in the memory 18 and notifies the control unit 20 of a discrimination result. On the basis of the discrimination result, the control unit 20 controls the memory controller 17 so as to read out the audio data corresponding to the reproducing time of one annual ring data from the memory 18. By the memory controller 17, the audio data is read out from the memory 18 on the basis of such control and supplied to the signal control unit 16, and the audio data is recorded onto the optical disc 1.

When the audio data corresponding to the reproducing time of one annual ring data is recorded, subsequently, similar processes are executed to, for example, the video data and the video annual ring data of one annual ring data is recorded from the data next to the audio annual ring data. In the auxiliary AV data, similarly, the data corresponding to the reproducing time of one annual ring data is also sequentially recorded.

As for the time-sequential metadata, for example, the camera data is supplied from the demultiplexer 41 to the control unit 20 and several data such as a UMID and the like in the time-sequential meta data is formed in the control unit 20. The camera data and the data formed in the control unit 20 are collectively set to the time-sequential meta data and stored into the memory 18 through the memory controller 17. In a manner similar to the above, the memory controller 17 reads out the time-sequential meta data corresponding to the reproducing time of one annual ring data from the memory 18 and supplies it to the signal processing unit 16.

In the control unit 20, the non-time-sequential meta data is also formed. The non-time-sequential metadata is recorded into the clip directory of the clip to which the data belongs.

As already described by using FIGS. 8 to 11, the data which is recorded onto the optical disc 1 as mentioned above is stored into the file. The audio data is stored into the file every channel and managed by the directory structure. For example, when the data is recorded onto the optical disc 1, the management information such as address information of each file, pointer information in the directory structure, information of the file names and directory names, and the like is recorded into predetermined management areas on the optical disc 1 by the control unit 20. The recorded file information and the like is reflected to the index file "INDEX.XML".

When the data is reproduced from the optical disc 1, the video data, the audio data of each channel, the auxiliary AV data, and the time-sequential meta data are read out from the optical disc 1 as mentioned above. At this time, the data of the low bit rates such as audio data of the main line system, auxiliary AV data, and time-sequential meta data is also reproduced at the reproducing speed of the video data of the main line system of the high bit rate. The reproducing speed of the data from the optical disc 1 is not changed in dependence on the data to be read out. The video data and the auxiliary AV data read out from the optical disc 1 are supplied from the memory controller 17 to an image data converting unit 45B and an auxiliary AV data converting unit 49, respectively. The audio data is supplied from the memory controller 17 to an audio data converting unit 46.

The image data converting unit 45B decodes the data series of the video data of the main line system which is supplied from the memory controller 17 and supplies the video signal thus obtained to a multiplexer 47. The auxiliary AV data converting unit 49 decodes the data series of the auxiliary AV data which is supplied from the memory controller 17 and supplies the video signal and the audio signal of 8 channels thus obtained to the multiplexer 47.

If the audio data which is supplied from the memory controller 17 is the linear PCM audio data, the audio data converting unit 46 sets, for example, the data series into a pair every 2 channels, constructs a subframe by adding the preamble and the bits V, U, C, and P to each sample, constructs a frame by interleaving the subframes every channel, further constructs one block by 192 frames, and outputs it as serial audio data which is specified by AES3-1992 (r1997). This audio data is supplied to the multiplexer 47. On the other hand, the audio data which is supplied from the memory controller 17 is the non-audio audio data, for example, it is stored into the subframe every word, forms the serial data as mentioned above, and outputs it. This data is supplied to the multiplexer 47.

In the image data converting unit 45B, audio data converting unit 46, and auxiliary AV data converting unit 49, it is also possible to supply the supplied reproduction data as it is to the multiplexer 47 without being decoded, multiplex those data, and output the multiplexed data. Further, it is also possible to omit the multiplexer 47 and independently output the respective data.

In the disc recording and reproducing apparatus 10 constructed as mentioned above, when the user instructs the recording of the data by operating the operation unit 21, the data which is supplied from the signal input/output unit 31 is supplied to the optical disc 1 through the data converting unit 19, memory controller 17, signal processing unit 16, and pickup unit 13 and recorded.

Upon recording, the user can change the bit rate of the video data of the main line system by operating the operation unit 21. For example, there is a using method whereby, initially, the recording is executed by setting the bit rate to 50 Mbps and, when the number of recordable areas on the optical disc 1 decreases, the bit rate is changed to a low bit rate such as 30 Mbps, thereby preventing the recording from being missed, or the like.

At this time, the clip is divided in correspondence to the change timing of the bit rate and the data after the change is recorded as a new clip onto the optical disc 1. The detection of the change in the bit rate can be performed by detecting the operation performed to the operation unit 21 or on the basis of a result obtained by monitoring the bit rate of the video data by the control unit 20. For example, it is also possible to construct in such a manner that, in the memory controller 17, the data of a predetermined bit position where the bit rate information has been described in the header of the video data of the main line system supplied from the data converting unit 19 is extracted and the change in bit rate is detected.

When the change in bit rate is detected, for example, the memory controller 17 is controlled by the control unit 20, the data before the bit rate change is swept out of the memory 18 and recorded onto the optical disc 1, and a new annual ring is formed by the data after the change.

When the change in the video data of the main line system is detected, the other data, that is the audio data of the main line system, the auxiliary AV data, and the time-sequential meta data are also similarly controlled by the memory controller 17 and the clip is divided. At this time, as mentioned above, the AV data of the main line system can be divided along the GOP boundary of the auxiliary AV data.

When the bit rate of the video data of the main line system is changed, if the bit rate of the actual video data is gradually changed, an unnatural change does not appear in the reproduced image, so that it is preferable.

Figure 17:
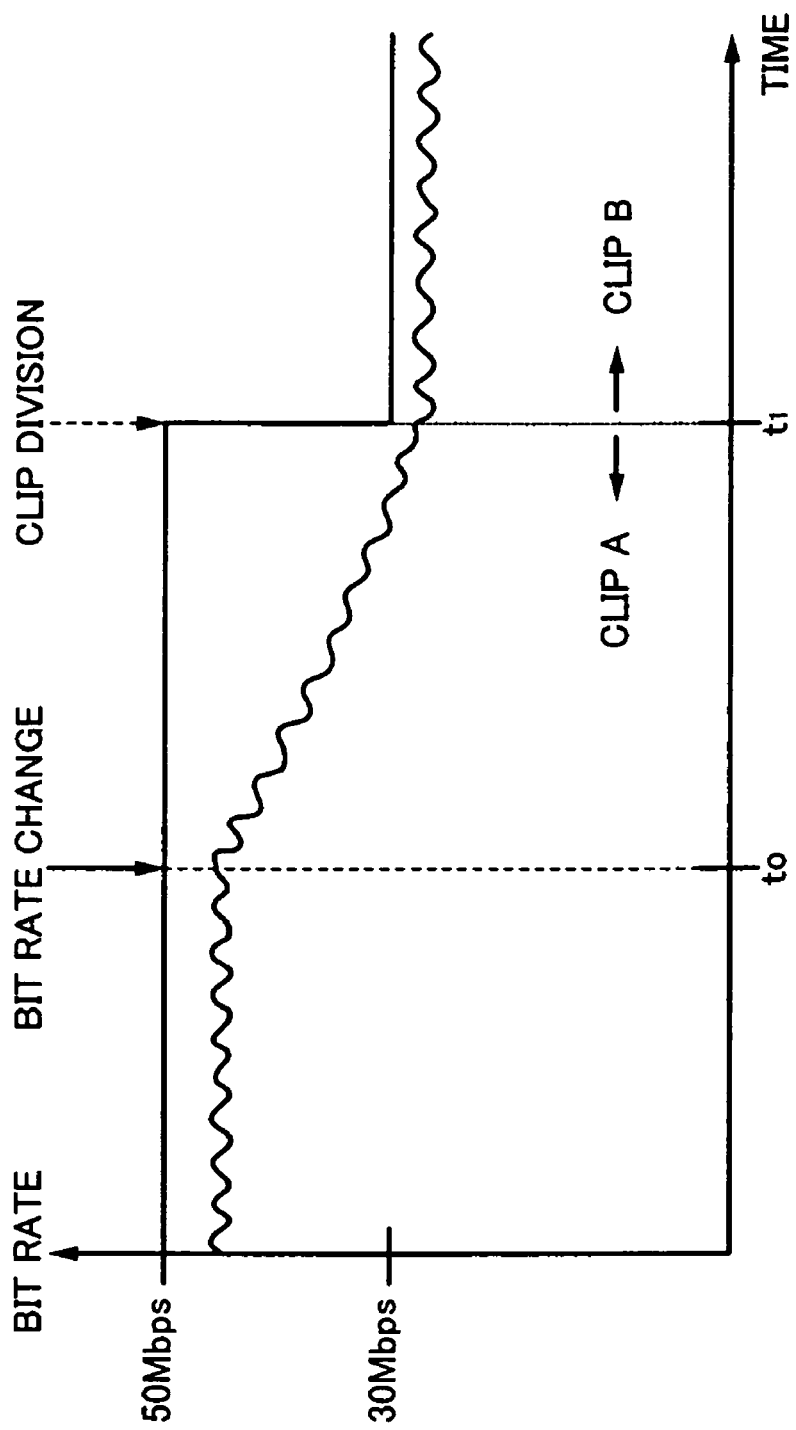
FIG. 17 is a diagram for explaining how a bit rate of actual video data is gradually changed when the bit rate is changed.

First, a case of changing from the high bit rate to the low bit rate will be described with reference to FIG. 17. It is assumed that, the bit rate mode has initially been set to 50 Mbps. It is instructed to change the bit ratemode to 30 Mbps at time $t_0$ by the operation to the operation unit 21 during the recording. By receiving such an instruction, the control unit 20 instructs the image signal converting unit 43 of the data converting unit 19 to change the bit rate. At this time, a time constant process is executed to a change speed of the bit rate so as to gradually decrease the bit rate toward target time $t_1$ after a predetermined time from time $t_0$. Time $t_1$ is set to a change point of the actual bit rate and the clip division is performed at this point.

In this case, even if the change in bit rate is instructed at time $t_0$, actually, the data is handled as video data of the bit rate mode before the change until the timing reaches time $t_1$. For example, the difference between the data amount according to the bit rate designated by the bit rate mode and the generation code amount according to the actual compression encoding is filled with the predetermined padding data.

In the case of changing from the low bit rate to the high bit rate, the process opposite to the above process is executed. That is, in the case of changing the bit rate which has initially been set to 30 Mbps to 50 Mbps, first, the bit rate mode is changed from 30 Mbps to 50 Mbps at the timing of the change instruction. The control unit 20 instructs the image signal converting unit 43 of the data converting unit 19 to execute the time constant process to the change speed of the bit rate so as to gradually increase the bit rate for a predetermined time. For example, the difference between the data amount by the bit rate designated by the bit rate mode and the generation code amount according to the actual compression encoding is filled with the predetermined padding data. The clip division is performed, for example, at the change point of the bit rate mode.

The control unit 20 instructs the bit rate of a value which decreases little by little at predetermined time intervals to the image signal converting unit 43, so that the bit rate can be gradually changed as mentioned above. In the image signal converting unit 43, the total code amount of the frame after the encoding is estimated in accordance with the value of the bit rate which is instructed so as to decrease little by little and the encoding process is executed in accordance with the estimated value.

With respect to the audio data, for example, it is possible to cope with a change in bit resolution of the audio data of the main line system inputted as linear PCM audio data. When the change is detected, the clip is divided at the change point in a manner similar to the case of the video data mentioned above. Also in this case, the clip division can be performed in accordance with the GOP boundary of the auxiliary AV data.

In the case of the audio data, it is possible to construct in such a manner that the bit resolution before the change is maintained after the change of the bit resolution and the clip division due to the change in bit resolution is not performed. For example, when the audio data which is inputted from the outside to the disc recording and reproducing apparatus 10 according to the embodiment of the invention is recorded onto the optical disc 1, if the bit resolution of the audio data which is inputted is changed from the initial value 24 bits to 16 bits at a certain time point, the bit resolution can be held to 24 bits even after the change in the bit resolution.

Subsequently, with respect to the audio data, "bit resolution of 24 bits" and "bit resolution of 16 bits" are properly abbreviated to "24 bits" and "16 bits", respectively.

Explanation will now be made by using FIGS. 18A and 18B. The bit resolution of the audio data which was initially inputted at 24 bits is changed to 16 bits at the bit resolution change point (FIG. 18A). At this time, as shown in an example in FIG. 18B, the data (for example, a value "0") showing the silence in the audio data is added to 8 bits on the lower side (LSB side) of the audio data changed to 16 bits, so that it is set to 24 bits as a whole. At this time, the data of 8 bits to be added is not limited to the silence but a dither can be also added.

For example, in the case where the audio data which has initially been set to 16 bits is changed to 24 bits, similarly, the bit resolution can be held to 16 bits even after the change in the bit resolution.

Explanation will be made by using FIGS. 19A and 19B. The bit resolution of the audio data which was initially inputted at 16 bits is changed to 24 bits at the bit resolution change point (FIG. 19A). At this time, as shown in an example in FIG. 19B, 8 bits on the lower side (LSB side) of the audio data which was inputted at 24 bits are abandoned, so that it is set to 16 bits as a whole.

Further, when the audio data which was inputted as linear PCM audio data is changed to the audio data encoded by an encoding system other than the linear PCM (hereinbelow, referred to as non-audio audio data), the non-audio audio data is muted and the recording can be continued without dividing the clip. The muting is executed by, for example, recording the audio data showing the silence. The non-audio audio data is recorded as silence audio data. That is, the non-audio audio data is replaced by the audio data showing the silence.

When the non-audio audio data is changed to the linear PCM audio data, the linear PCM audio data can be recorded by the clip after the division.

The converting process of the bit resolution of the audio data and the silence process upon inputting of the non-audio audio data as mentioned above can be executed by, for example, the audio signal converting unit 44 based on the instruction from the control unit 20. The invention is not limited to it but they can be also executed by the process upon reading out the audio data from the memory 18 by the control of the memory controller 17 based on the instruction from the control unit 20. For example, the data showing the non-audio audio data corresponding to, for example, one sample is stored into the memory 18 and this data is repetitively read out.

As for the resolution of the audio data, in the case where the audio data is transmitted in the format (for example, AES3-1992 (r1997)) which conforms with the standard by AES/EBU (Audio Engineering Society/European Broadcasting Union) which is generally used in, for example, a broadcasting station or the like, since the information of the bit resolution is stored in a predetermined position of the header, by extracting this data, it can be discriminated. The linear PCM audio data and the non-audio audio data can be also similarly discriminated from the header information or the like.

Although the change of the bit rate during the recording has been described above with respect to the video data of the main line system, the invention is not limited to such an example. The disc recording and reproducing apparatus 10 according to the embodiment of the invention can also cope with a change in frame rate during the recording, a change in image size or aspect ratio, or the like. In this case, upon reproduction, when the frame rate is changed, an interpolating/decimating process in the time base direction is executed. When the image size or aspect ratio is changed, the interpolating/decimating process is executed in the frame. Thus, the video data can be outputted at the predetermined frame rate, image size, or image aspect ratio. Such an interpolating/decimating process is executed, for example, to the video data stored in the memory 18 by the memory controller 17. It can be also executed to the image signal converting unit 43.

Although the explanation has been made on the assumption that the encoding system of the video data of the main line system is MPEG2, the invention is not limited to such an example. The video data encoded by further another system can be recorded so as to exist mixedly. As for the bit rate of the video data or other parameters, similarly, the invention can also cope with them other than those mentioned above.

With respect to the audio data as well, similarly, in the case of encoding it into the non-audio, further another encoding system can be used. Also as for the audio data, the bit resolution is not limited to 16 bits and 24 bits but audio data of other bit resolution such as 32 bits, 8 bits, 12 bits, and the like can be recorded so as to exist mixedly. Although the standard sampling frequency of to the audio data is set to 48 kHz, the invention is not limited to this example. For example, audio data of other sampling frequencies such as 96 kHz, 192 kHz, and the like can be recorded so as to exist mixedly.

Further, the auxiliary AV data is also not limited to the MPEG4 system and video data encoded by other systems can be also recorded so as to exist mixedly.

Moreover, if a list of the clips recorded on the optical disc 1 can be displayed on a monitoring apparatus or the like (not shown), it is preferable. For example, the index file "INDEX.XML" is read out in accordance with the operation to the operation unit 21 by the user and information of all of the clips recorded on the optical disc 1 is obtained. A thumbnail image is automatically formed on the basis of the auxiliary AV data with reference to each clip directory. The thumbnail image is formed each time by a method whereby, for example, the frame in the predetermined position of the auxiliary AV data is read out and a process for reducing into a predetermined image size or the like is executed.

The thumbnail image data of each clip is supplied to the memory controller 17 and stored in the memory 18. The thumbnail image data stored in the memory 18 is read out by the memory controller 17 and supplied to the monitoring apparatus (not shown) through the data converting unit 19 and the signal input/output unit 31, and the list of the thumbnail images is displayed on the monitoring apparatus. Display control of the thumbnail images to the monitoring apparatus can be made by the operation from the operation unit 21. It is also possible to select a desired image from the thumbnail images and reproduce the clip corresponding to the selected thumbnail image by a predetermined operation to the operation unit 21.

When the thumbnail images are displayed onto the monitoring apparatus as mentioned above, various information of the clip corresponding to the displayed thumbnail image, for example, the bit rate of the video data of the main line system, the encoding system, and the like can be also displayed together with the thumbnail image. Such a process can be realized by reading out the time-sequential meta data and the non-time-sequential meta data from each clip directory.

Although the embodiment has been described above with respect to the case where the audio data of the channel pair which is specified by AES3-1992 (r1997) is separated into the channels and recorded on the optical disc 1 as an audio data file of each channel, and the audio data recorded every channel on the optical disc 1 is interleaved between the channels every sample and outputted as serial audio data, the invention is not limited to such an example. That is, also in the case of the audio data in which multi-channels have been multiplexed by another system and which has been supplied, it is also possible to separate the channels and record as an audio data file of each channel onto the optical disc 1. This is similarly true of the output. In the case of the output, the audio data of multi-channels can be multiplexed by a system different from the system of the data inputted upon recording onto the optical disc 1 and outputted.

As described above, according to the invention, the number of audio channels of the auxiliary AV data has been fixed irrespective of the number of channels of the audio data of the main line system and the data has been recorded on the recording medium. Therefore, there is such an effect that even if the number of channels of the audio data of the main line system is changed upon recording, there is no need to change the process of the audio data of the auxiliary AV data at the change point of the number of channels of the main line system upon reproduction in the process of the auxiliary AV data, and the operation such as shuttle reproduction or the like using the auxiliary AV data can be easily executed.

In the embodiment of the invention, even if the number of channels of the audio data of the main line system is changed, the number of channels of the audio data of the auxiliary AV data is fixed irrespective of the number of channels of the audio data of the main line system. In the channels of the auxiliary AV data, the audio data showing the silence is recorded in the channels in which the audio data of the main line system is not inputted. Therefore, there is such an effect that even if the number of channels of the audio data of the main line system upon recording is less than the number of channels of the audio data of the auxiliary AV data, the process for muting the channels which are not used or the like is unnecessary in the process of the auxiliary AV data upon reproduction.

DESCRIPTION OF REFERENCE NUMERALS

1 OPTICAL DISC
10 DISC RECORDING AND REPRODUCING APPARATUS
16 SIGNAL PROCESSING UNIT
17 MEMORY CONTROLLER
18 MEMORY
19 DATA CONVERTING UNIT
20 CONTROL UNIT
21 OPERATION UNIT
31 SIGNAL INPUT/OUTPUT UNIT
42 DATA AMOUNT DETECTING UNIT
43 IMAGE SIGNAL CONVERTING UNIT
44 AUDIO SIGNAL CONVERTING UNIT
45B IMAGE DATA CONVERTING UNIT
46 AUDIO DATA CONVERTING UNIT
48 AUXILIARY AV DATA CONVERTING UNIT
49 AUXILIARY AV DATA CONVERTING UNIT

The invention claimed is:

1. A recording apparatus for recording video data and audio data corresponding to the video data onto a disc-shaped recording medium, comprising:

data forming means for forming second video data which is data based on first video data and whose transmission rate and resolution are lower than those of said first video data forming second audio data by compression encoding first audio data, said second audio data having a plurality of channels which is data based on said first audio data having zero, one, or a plurality of channels corresponding to said first video data, the number of channels of said second audio data being set to a fixed value independent of change of the number of channels of said first audio data during recording process, and whose transmission rate is lower than that of said first audio data, and outputting data of a low rate in which said second video data and said second audio data have been multiplexed,
  wherein the number of channels of said second audio data is not less than the number of channels of said first audio data; and
recording means for recording said first video data, said first audio data, said low-rate data comprised of multiplexed second video data and second audio data, and meta data corresponding to the first video data and first audio data onto the disc-shaped recording medium,
  wherein said first video data, said first audio data, said low-rate data, and said meta data form first video annual ring data, first audio annual ring data, low-rate annual ring data, and meta annual ring data on the disc-shaped recording medium, respectively, and the first video annual ring data, the first audio annual ring data, the low-rate annual ring data, and the meta annual ring data are recorded in continuous areas on the disc-shaped recording medium and are recorded in a particular sequence from an inner rim side of the disc-shaped recording medium, and
  wherein said data forming means forms audio data showing silence to the channels which do not correspond to the channels of said first audio data among said plurality of channels of said second audio data and outputs said low-rate data in which said second video data and said second audio data including the channels of the audio data showing said silence have been multiplexed.

2. A non-transitory computer-readable medium storing a computer program that when executed on a computer causes of recording video data and audio data corresponding to the video data onto a disc-shaped recording medium, the program comprising the steps of:

a data forming step of forming second video data which is data based on first video data and whose transmission rate and resolution are lower than those of said first video data, forming second audio data by compression encoding first audio data, said second audio data having a plurality of channels which is data based on said first audio data having zero, one, or a plurality of channels corresponding to said first video data, the number of channels of said second audio data being set to a fixed value independent of change of the number of channels of said first audio data during recording process, and whose transmission rate is lower than that of said first audio data, and outputting data of a low rate in which said second video data and said second audio data have been multiplexed,
  wherein the number of channels of said second audio data is not less than the number of channels of said first audio data; and
a recording step of recording said first video data, said first audio data, said low-rate data comprised of multiplexed second video data and second audio data, and meta data corresponding to the first video data and first audio data onto the disc-shaped recording medium,
  wherein said first video data, said first audio data, said low-rate data, and said meta data form first video annual ring data, first audio annual ring data, low-rate annual ring data, and meta annual ring data on the disc-shaped recording medium, respectively, and the first video annual ring data, the first audio annual ring data, the low-rate annual ring data, and the meta annual ring data arc recorded in continuous areas on the disc-shaped recording medium and are recorded in a particular sequence from an inner rim side of the disc-shaped recording medium, and
wherein said data forming step forms audio data showing silence to the channels which do not correspond to the channels of said first audio data among said plurality of channels of said second audio data and outputs said low-rate data in which said second video data and said second audio data including the channels of the audio data showing said silence have been multiplexed.

* * * * *